(12) United States Patent
Cauley, III et al.

(10) Patent No.: US 10,898,895 B2
(45) Date of Patent: Jan. 26, 2021

(54) VENTED CONVERGING CAPILLARY BIOLOGICAL SAMPLE PORT AND RESERVOIR

(71) Applicant: Talis Biomedical Corporation, Menlo Park, CA (US)

(72) Inventors: Thomas H. Cauley, III, Redwood City, CA (US); David Alexander Rolfe, San Francisco, CA (US); Marc Valer Serra, Menlo Park, CA (US)

(73) Assignee: Talis Biomedical Corporation, Menlo Park, CA (US)

( * ) Notice: Subject to any disclaimer, the term of this patent is extended or adjusted under 35 U.S.C. 154(b) by 257 days.

(21) Appl. No.: 16/130,927

(22) Filed: Sep. 13, 2018

(65) Prior Publication Data

US 2020/0086315 A1    Mar. 19, 2020

(51) Int. Cl.
  *B01L 3/00*    (2006.01)
  *G01N 35/10*   (2006.01)

(52) U.S. Cl.
  CPC ........ *B01L 3/502715* (2013.01); *G01N 35/10* (2013.01); *B01L 2200/0684* (2013.01); *B01L 2200/14* (2013.01); *B01L 2300/042* (2013.01); *B01L 2300/0848* (2013.01); *B01L 2300/0877* (2013.01); *B01L 2300/12* (2013.01); *G01N 2035/1053* (2013.01)

(58) Field of Classification Search
  CPC .. B01L 3/502715; B01L 3/5027; B01L 3/502; B01L 3/50; B01L 2200/0684; B01L 2200/06; G01N 35/10; G01N 35/00

USPC .............................. 436/63; 422/502, 500, 50
See application file for complete search history.

(56) References Cited

U.S. PATENT DOCUMENTS

| | | | |
|---|---|---|---|
| 3,495,253 | A | 2/1970 | Richards |
| 3,503,410 | A | 3/1970 | Richards |
| 3,656,495 | A | 4/1972 | Noren |
| 4,007,639 | A | 2/1977 | Haeckel |
| 4,618,476 | A | 10/1986 | Columbus |
| 6,015,531 | A | 1/2000 | Colin et al. |
| 7,347,617 | B2 | 3/2008 | Pugia et al. |
| 7,754,472 | B2 | 7/2010 | Schwind et al. |

(Continued)

FOREIGN PATENT DOCUMENTS

| | | |
|---|---|---|
| WO | WO2003013703 | 2/2003 |
| WO | WO2005003724 | 1/2005 |

(Continued)

*Primary Examiner* — Christine T Mui
(74) *Attorney, Agent, or Firm* — Shay Glenn LLP

(57) ABSTRACT

This disclosure relates to an assembly for loading a sample liquid. The assembly comprises an entry port comprising an inlet and a gas vent, and a reservoir. The reservoir comprises a distal wall, a fin, and a continuous fluidic pathway. The fin comprises first and second surfaces and extends from the inlet towards the distal wall. The continuous fluidic pathway comprises a converging channel that is in fluidic communication with the inlet and is defined by the second surface of the fin, and a diverging channel that is defined by the first surface of the fin and is in fluidic communication with the gas vent. At a distal end of the fin, a width of the converging channel at most equals a width of the diverging channel, and the width of the converging channel at most equals a distance between the distal end of the fin and the distal wall.

50 Claims, 11 Drawing Sheets

(56) References Cited

U.S. PATENT DOCUMENTS

| | | | |
|---|---|---|---|
| 8,021,614 B2 * | 9/2011 | Huang | B03C 1/30 422/73 |
| 8,216,853 B2 | 7/2012 | Miller et al. | |
| 8,222,049 B2 | 7/2012 | Linder et al. | |
| 8,304,245 B2 | 11/2012 | Kuypers et al. | |
| 8,318,439 B2 | 11/2012 | Battrell et al. | |
| 8,586,348 B2 | 11/2013 | Wang et al. | |
| 8,679,423 B2 | 3/2014 | Fouillet | |
| 8,741,235 B2 | 6/2014 | Janisch et al. | |
| 9,146,246 B2 | 9/2015 | Battrell et al. | |
| 9,283,560 B2 | 3/2016 | Dothie | |
| 9,289,787 B2 | 3/2016 | Doak et al. | |
| 9,304,334 B2 | 4/2016 | Progler | |
| 9,533,879 B2 | 1/2017 | Cao et al. | |
| 9,561,504 B2 | 2/2017 | Palmieri et al. | |
| 9,573,128 B1 | 2/2017 | McClelland | |
| 9,579,651 B2 | 2/2017 | Phan et al. | |
| 9,592,505 B2 | 3/2017 | Linder et al. | |
| 9,678,065 B2 | 6/2017 | Sugarman et al. | |
| 9,726,588 B2 | 8/2017 | Hofmann et al. | |
| 9,804,091 B2 | 10/2017 | Nicholls et al. | |
| 9,822,890 B2 | 11/2017 | Juncker et al. | |
| 9,849,455 B2 | 12/2017 | Linder et al. | |
| 2004/0163958 A1 | 8/2004 | Kao et al. | |
| 2004/0265172 A1 | 12/2004 | Pugia et al. | |
| 2005/0041525 A1 | 2/2005 | Pugia et al. | |
| 2007/0105206 A1 | 5/2007 | Lu et al. | |
| 2007/0128083 A1 | 6/2007 | Yantz et al. | |
| 2008/0257754 A1 | 10/2008 | Pugia et al. | |
| 2009/0071828 A1 | 3/2009 | Squires et al. | |
| 2009/0117555 A1 | 5/2009 | Kuypers et al. | |
| 2010/0112723 A1 | 5/2010 | Battrell et al. | |
| 2011/0287948 A1 | 11/2011 | Suresh et al. | |
| 2011/0289043 A1 | 11/2011 | Suresh et al. | |
| 2011/0293558 A1 | 12/2011 | Suresh et al. | |
| 2011/0296903 A1 | 12/2011 | Cao et al. | |
| 2012/0034707 A1 | 2/2012 | Datta et al. | |
| 2012/0064505 A1 | 3/2012 | Suresh et al. | |
| 2012/0070833 A1 | 3/2012 | Wang et al. | |
| 2012/0241013 A1 | 9/2012 | Linder et al. | |
| 2012/0276635 A1 | 11/2012 | Lu et al. | |
| 2013/0142708 A1 | 6/2013 | Battrell et al. | |
| 2014/0194313 A1 | 7/2014 | Craighead et al. | |
| 2014/0197101 A1 | 7/2014 | Harjes et al. | |
| 2014/0197105 A1 | 7/2014 | DiBiasio et al. | |
| 2014/0204450 A1 | 7/2014 | Progler | |
| 2014/0260559 A1 | 9/2014 | Hofmann et al. | |
| 2015/0096936 A1 | 4/2015 | DiBiasio et al. | |
| 2016/0045655 A1 | 2/2016 | Charest et al. | |
| 2016/0158428 A1 | 6/2016 | Charest et al. | |
| 2016/0209431 A1 | 7/2016 | Battrell et al. | |
| 2016/0209639 A1 | 7/2016 | Progler | |
| 2017/0165665 A1 | 6/2017 | Linder et al. | |
| 2017/0313580 A1 | 11/2017 | Cao et al. | |
| 2018/0071735 A1 | 3/2018 | Linder et al. | |

FOREIGN PATENT DOCUMENTS

| | | |
|---|---|---|
| WO | WO2005018787 | 3/2005 |
| WO | WO2006102516 | 9/2006 |
| WO | WO2007011622 | 1/2007 |
| WO | WO2009131677 | 10/2009 |
| WO | WO2009146160 | 12/2009 |
| WO | WO2009149005 | 12/2009 |
| WO | WO2009149362 | 12/2009 |
| WO | WO2010040103 | 4/2010 |
| WO | WO2011119492 | 9/2011 |
| WO | WO2012040493 | 3/2012 |
| WO | WO2012170560 | 12/2012 |
| WO | WO2013024030 | 2/2013 |
| WO | WO2013029159 | 3/2013 |
| WO | WO2014110132 | 7/2014 |
| WO | WO2014110133 | 7/2014 |
| WO | WO2016005741 | 1/2016 |
| WO | WO2016029164 | 2/2016 |
| WO | WO2016090264 | 6/2016 |
| WO | WO2017143065 | 8/2017 |
| WO | WO2017210334 | 12/2017 |

* cited by examiner

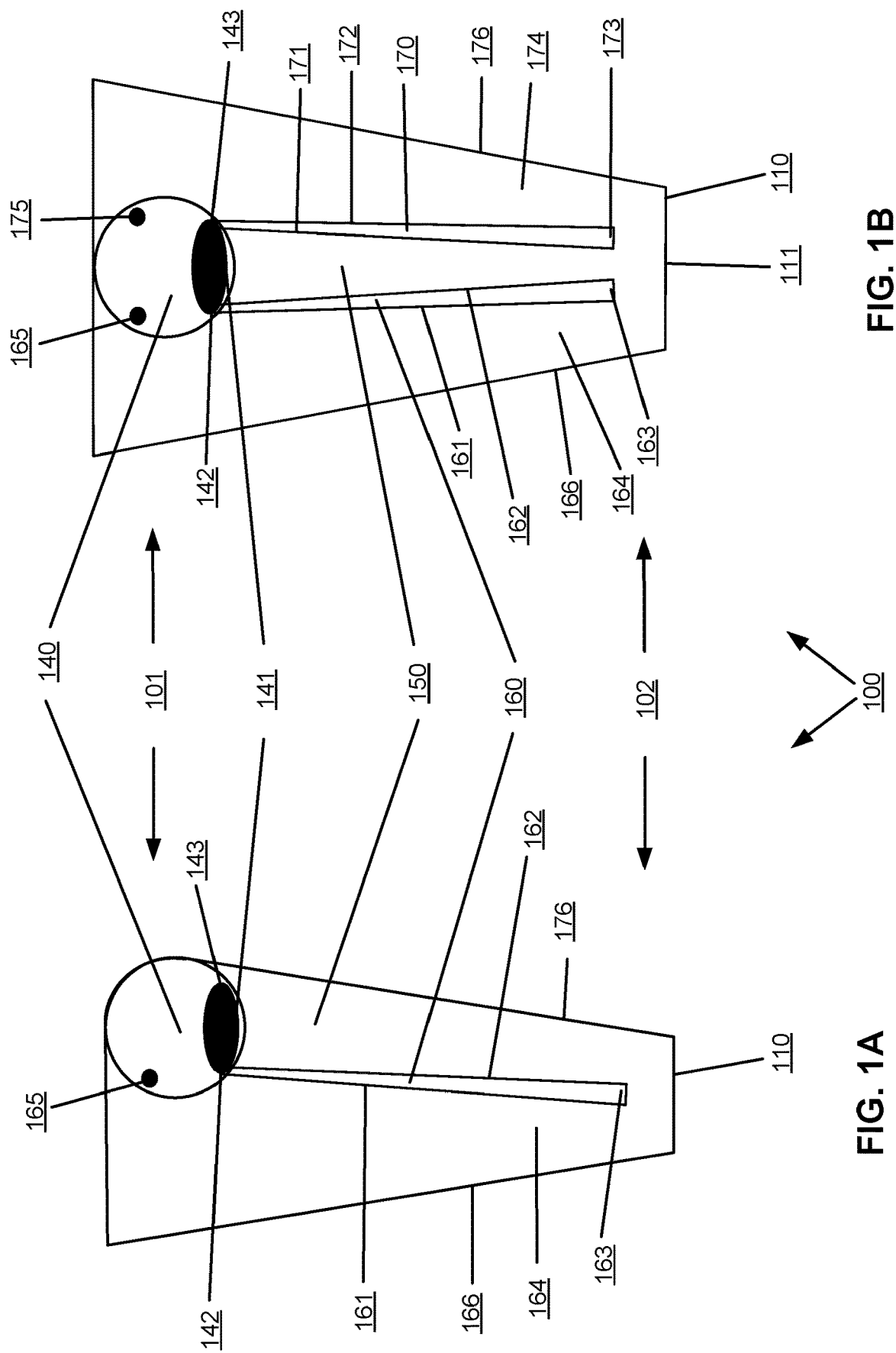

VENTED CONVERGING CAPILLARY BIOLOGICAL SAMPLE PORT AND RESERVOIR

TECHNICAL FIELD

The present invention relates to the field of fluidic devices that are capable of receiving and transporting a sample liquid. In particular, the present disclosure is directed toward systems, devices, and methods for loading a sample liquid into an assembly, and transferring the loaded sample liquid within the assembly, while minimizing spilling of the sample liquid from the assembly.

BACKGROUND

Many existing fluidic devices are configured to receive a sample liquid at one location in the fluidic device, e.g., an entry port, and subsequently transfer the sample liquid from the first location in the fluidic device to an alternative location in the fluidic device, e.g., a reservoir. Such fluidic devices comprise continuous fluidic pathways that are configured to transport the sample liquid from the first location in the fluidic device to the alternative location of the fluidic device.

In these existing fluidic devices, transport of the sample liquid within the fluidic device is commonly achieved using pneumatic force. However a gas supply cannot be used to load the sample liquid into the device. In such cases, capillary forces and surface tension are commonly used to trap the sample liquid in a desired location within the device. True capillary features rely on hydrophilic channel walls and channel diameters significantly under 1 mm. Such approaches are appropriate for the collection of several drops of sample liquid, but are inefficient for volumes of sample liquid on the order of 1 mL. Converging channels can be used to partially direct the loading of sample liquid, but the surface tension forces experienced in such channels are limited, and can be hampered by encapsulated gas or changes in shape of the channels.

The novel devices described herein include fluidic devices that are configured optimize transport of sample liquid from a proximal region of the fluidic device to a distal region of the fluidic device. More specifically, the devices described herein enable efficient transport of a precise volume of sample liquid from a proximal region of a fluidic device to a distal region of the device, thereby optimizing the speed and reliability of assays performed using the sample liquid at the distal region of the fluidic device.

SUMMARY

The present disclosure relates generally to an assembly that transports a loaded sample liquid from an entry port of the assembly to a reservoir of the assembly, while minimizing spilling of the sample liquid from the assembly.

In one aspect, the disclosure provides an assembly that comprises an entry port and a reservoir. The entry port is located at a proximal region of the assembly, and comprises an inlet and a first gas vent. The inlet defines an opening of the entry port. The inlet of the entry port has a first lateral edge and a second lateral edge. The first gas vent defines another opening of the entry port. Turning to the reservoir of the assembly, the reservoir comprises a distal wall, a first fin, and a continuous fluidic pathway. In some embodiments, the reservoir of the assembly holds a volume of up to 10 milliliters. The distal wall of the reservoir is located at a distal region of the assembly that is opposite the proximal region of the assembly. The first fin of the reservoir extends from the first lateral edge of the inlet of the entry port towards the distal wall. The first fin comprises a first surface and a second surface. In certain embodiments, the first fin increases in thickness as a distance from the entry port increases. The continuous fluidic pathway of the reservoir comprises a converging channel and a first diverging channel. The converging channel is in fluidic communication with the inlet of the entry port, and is defined in part by the second surface of the first fin. In some embodiments, the width of the converging channel decreases linearly as a function of increasing distance from the entry port. The first diverging channel of the continuous fluidic pathway is defined in part by the first surface of the first fin, and is in fluidic communication with the first gas vent of the entry port. To neutralize forces between the converging channel and the first diverging channel at the distal region of the assembly, such that a sample liquid can concentrate at the distal region of the assembly, at a distal end of the first fin (i.e., the portion of the first fin that is closest in proximity to the distal wall of the reservoir), a width of the converging channel is substantially equivalent to, or less than, a width of the first diverging channel. Furthermore, a distance between the distal end of the first fin and the distal wall is substantially equivalent to, or less than, the width of the converging channel at the distal end of the first fin.

In addition to being defined by the first surface of the first fin, in some embodiments, the first diverging channel is further defined by a first lateral wall of the reservoir. In such embodiments, the first lateral wall extends between the proximal region of the assembly and the distal wall. Similarly, in addition to being defined by the second surface of the first fin, in some embodiments, the converging channel is further defined by a second lateral wall of the reservoir. In such embodiments, like the first lateral wall, the second lateral wall also extends between the proximal region of the assembly and the distal wall.

To further support transport of a sample liquid from the entry port into the distal region of the assembly and thereby avoid spilling of the sample liquid from the entry port, in some embodiments, the width of the converging channel at the inlet of the entry port is less than a height of the inlet of the entry port. In further embodiments, the reservoir is taller at the distal end of the first fin than at the inlet of the entry port. Furthermore, at the inlet of the entry port, the converging channel can be taller than the inlet. Finally, in some embodiments, at least a portion of the converging channel can be at least twice as tall as the inlet of the entry port.

To even further support transport of a sample liquid from the entry port into the distal region of the assembly and thereby avoid spilling of the sample liquid from the entry port, in some embodiments, the assembly can comprise a hydrophobic material such that the contact angle between water and a surface of the assembly is between 90 and 120 degrees, more preferably between 90 and 110 degrees.

In certain embodiments, the reservoir of the assembly further comprises a second fin. In such embodiments, the second fin extends from the second lateral edge of the inlet towards the distal wall. Like the first fin, the second fin comprises a first surface and a second surface. In embodiments in which the reservoir comprises a second fin, instead of the second lateral wall further defining the converging channel as described above, the first surface of the second fin further defines the converging channel. Furthermore, the second surface of the second fin in part defines a second diverging channel. In embodiments in which the first diverging channel and the second diverging channel are not in fluidic communication with one another via a shared proximal portion of the reservoir, but rather the first diverging channel is in fluidic communication with a first proximal portion of the reservoir and the second diverging channel is in fluidic communication with a separate, second proximal portion of the reservoir, the second diverging channel is in fluidic communication with a second gas vent of the entry port. However, in alternative embodiments in which the first diverging channel and the second diverging channel are in fluidic communication with one another via a shared proximal portion of the reservoir, inclusion of a second gas vent in fluidic communication with the second diverging channel is optional. To neutralize forces between the converging channel and the first and second diverging channels at the distal region of the assembly, such that a sample liquid can concentrate at the distal region of the assembly, at a distal end of the second fin (i.e., the portion of the second fin that is closest in proximity to the distal wall of the reservoir), a width of the converging channel is substantially equivalent to, or less than, a width of the second diverging channel. Furthermore, a distance between the distal end of the second fin and the distal wall is substantially equivalent to, or less than, the width of the converging channel at the distal end of the second fin.

In embodiments in which the reservoir of the assembly comprises a second fin, in some embodiments, the second diverging channel is further defined by a second lateral wall of the reservoir. This second lateral wall extends between the proximal region of the assembly and the distal wall of the reservoir. Furthermore, in certain embodiments, the first fin and the second fin are located a substantially equivalent distance from a center point of the distal wall. In further embodiments, a length of the first fin is substantially equivalent to a length of the second fin. Additionally, like the first fin, in some embodiments, the second fin can increase in thickness as a distance from the entry port increases.

In certain embodiments of the disclosed assembly, the assembly further comprises a top wall. In embodiments in which the assembly comprises a top wall, the top wall extends between the proximal region of the assembly and the distal wall, and bounds, at least in part, the reservoir of the assembly. In embodiments in which the reservoir comprises a first fin, the top wall can contact the first fin, thereby preventing a sample liquid contained within the assembly from flowing over the first fin between the converging channel and the first diverging channel. However, in alternative embodiments, the assembly still functions as described herein when top wall does not contact the first fin. In further embodiments in which the assembly comprises a second fin, the top wall may also contact the second fin, thereby preventing a sample liquid contained within the assembly from flowing over the second fin between the converging channel and the second diverging channel. Similarly, in alternative embodiments, the assembly still functions as described herein when top wall does not contact the second fin. In some aspects, at least a portion of the top wall comprises a transparent viewing window that enables a user of the assembly to monitor a height of a sample liquid in the reservoir of the assembly.

In further embodiments of the disclosed assembly, the assembly further comprises a base. In embodiments in which the assembly comprises a base, the base extends between the proximal region of the assembly and the distal wall of the reservoir, and bounds, at least in part, the entry port and the reservoir of the assembly. The base can comprise a thin film. In some embodiments, the base further bounds a bottom edge of the inlet of the entry port and/or a bottom surface of the entry port.

In some embodiments, the assembly can further comprise an exit port, a cap, a gas conduit, and/or a pressurized gas source. In embodiments in which the assembly further comprises an exit port, the exit port is located at a distal region of the assembly. In embodiments in which the assembly further comprises a cap, the cap is configured to seal the entry port. In embodiments in which the assembly further comprises a gas conduit, the gas conduit is located at the proximal region of the assembly. In some embodiments, the gas conduit is in fluidic communication with the entry port. In alternative embodiments, the gas conduit is in fluidic communication with the reservoir of the assembly at the proximal region of the assembly. In embodiments in which the assembly further comprises a pressurized gas source, the pressurized gas source is in fluidic communication with the gas conduit, and is configured to supply a gas to the gas conduit. In alternative embodiments, the assembly does not comprise a pressurized gas source.

In one state of the assembly, the gas conduit and the exit port are closed and the cap is removed from the entry port such that the entry port is not sealed. In another state of the assembly, the cap is in place such that the entry port is sealed and the exit port and the gas conduit are open.

In another aspect, the disclosure provides a fluidic device that comprises, at least in part, an embodiment of the assembly described above that comprises a cap. In such embodiments, a top of the cap can be recessed from a surface of the fluidic device when the cap is in place over the entry port. Alternatively, the top of the cap can be flush with the surface of the fluidic device when the cap is in place over the entry port.

In another aspect, the disclosure provides a method for loading a sample liquid into an assembly. The method includes receiving an assembly according to one of the embodiments described above, and introducing a sample liquid into the entry port of the assembly. In certain embodiments, the sample liquid is introduced into the entry port via a pipette. In further embodiments, a volume of the reservoir can be about twice a volume of the introduced sample liquid. In embodiments in which the assembly comprises the cap, the gas conduit, and the exit port, the method further comprises removing the cap from the entry port such that the entry port is not sealed, and closing the gas conduit and the exit port prior to introduction of the sample liquid into the entry port of the assembly.

Upon introduction of the sample liquid into the entry port of the assembly, the sample liquid is drawn through the inlet of the entry port and into the converging channel. In some embodiments, the sample liquid is drawn through the inlet of the entry port into the converging channel at a rate such that the entry port does not overflow with the sample liquid. Upon entering the converging channel, the sample liquid is then drawn toward the distal region of the assembly, where the sample liquid contacts the distal wall. In embodiments in which the assembly comprises a transparent viewing window that is located above the reservoir, the method can further comprise the step of monitoring a height of the sample liquid within the reservoir via the transparent viewing window.

Upon entering the distal region of the assembly, the sample liquid flows into the diverging channel(s) of the assembly. Upon entry of the sample liquid into the diverging channel(s), the diverging channel(s) retard flow of the sample liquid in the diverging channel(s) toward the gas vent(s). Due to this retardation of flow of the sample liquid in the diverging channel(s), the sample liquid concentrates at the distal region of the assembly.

In embodiments of the disclosed method in which the assembly comprises the cap, the gas conduit, the pressurized gas source, and the exit port, the method further comprises placing the cap over the entry port such that the entry port is sealed, rotating the assembly such that a length of the converging channel is parallel to gravity, opening the exit port and the gas conduit, and supplying, with the pressurized gas source, via the gas conduit, a pressurized gas into the assembly.

In embodiments of the assembly in which the gas conduit is in fluidic communication with the entry port, the pressurized gas is supplied to the entry port of the assembly. Upon entry of the pressurized gas into the entry port, the pressurized gas travels into the converging channel via the inlet of the entry port and into the diverging channel(s) via the gas vent(s). Specifically, in embodiments in which the assembly comprises one or more diverging channels in fluidic communication with a shared proximal portion of the reservoir, and thus at least one gas vent in fluidic communication with the shared proximal portion of the reservoir, upon entry of the gas into the entry port, the gas travels into the one or more diverging channels via the at least one gas vent in fluidic communication with the shared proximal portion of the reservoir, and into the converging channel via the inlet. In alternative embodiments in which the assembly comprises multiple diverging channels, with one or more of the multiple diverging channels in fluidic communication with separate proximal portions of the reservoir, and thus at least one gas vent in fluidic communication with each separate proximal portion of the reservoir, upon entry of the gas into the entry port, the gas travels into the one or more diverging channels in fluidic communication with each separate proximal portion of the reservoir via the at least one gas vent in fluidic communication with each separate proximal portion of the reservoir, and into the converging channel via the inlet.

In alternative embodiments, the gas conduit is in fluidic communication with the converging channel of the assembly at a location proximal to the inlet of the entry port. In a preferred embodiment of this placement of the gas conduit, the gas conduit enters the converging channel from a top wall of the assembly. In such embodiments, a pressurized gas is supplied into the converging channel of the assembly via the opened gas conduit. Upon entry of the pressurized gas into the converging channel, the pressurized gas directly enters the converging channel and travels into the diverging channel(s) via the inlet of the entry port and the gas vent(s) of the entry port. Specifically, upon entry of the pressurized gas into the converging channel via the gas conduit, the gas directly enters the converging channel, and travels into one or more diverging channels of the assembly via the inlet, the entry port, and the gas vent(s) that are in fluidic communication with one or more proximal portions of the reservoir.

In further alternative embodiments of the assembly in which the gas conduit is in fluidic communication with a proximal portion of the reservoir, the gas is supplied to the proximal portion of the reservoir. Upon entry of the pressurized gas into the proximal portion of the reservoir, the pressurized gas travels into the into the diverging channel(s) via the fluidic connections between the diverging channel(s) and the proximal portion of the reservoir, and into the converging channel via the gas vent(s) and the inlet of the entry port. Specifically, in embodiments in which the assembly comprises one or more diverging channels that are in fluidic communication with a shared proximal portion of the reservoir, and thus at least one gas vent in fluidic communication with the shared proximal portion of the reservoir, upon entry of the gas into the shared proximal portion of the reservoir, the gas travels into the one or more diverging channels via the fluidic connection between the shared proximal portion of the reservoir and the one or more diverging channels, and into the converging channel via the at least one gas vent in fluidic communication with the shared proximal portion of the reservoir, the entry port, and the inlet of the entry port. In alternative embodiments in which the assembly comprises multiple diverging channels, with one or more of the multiple diverging channels in fluidic communication with separate proximal portions of the reservoir, and thus at least one gas vent in fluidic communication with each separate proximal portion of the reservoir, upon entry of the gas into the entry port, when the gas enters one of the separate proximal portions of the reservoir via the gas conduit, the gas travels into the one or more diverging channels in fluidic communication with the one separate proximal portion of the reservoir via the fluidic communication between the one separate proximal portion of the reservoir and the one or more diverging channels. Then, to travel into the one or more diverging channels in fluidic communication with the other separate proximal portion(s) of the reservoir, the gas travels into the entry port via the at least one gas vent in fluidic communication with the one separate proximal portion of the reservoir, into the other separate proximal portion(s) of the reservoir via the at least one gas vent in fluidic communication with each of the other separate proximal portion(s) of the reservoir, and into the one or more diverging channels in fluidic communication with the other separate proximal portion(s) of the reservoir via the fluidic connection(s) between the one or more diverging channels and the other separate proximal portion(s) of the reservoir. Finally, to travel into the converging channel, the gas travels through the inlet of the entry port into the converging channel.

Regardless of the path by which the gas enters the converging channel and the diverging channel(s), entry of the gas into the converging channel and the diverging channel(s) forces the sample liquid located in the converging channel and in the diverging channel(s) towards the open exit port. Upon reaching the open exit port, the sample liquid is transported out of the apparatus via the open exit port.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific systems, devices, and methods disclosed. In addition, the drawings are not necessarily drawn to scale. In the drawings:

FIG. 1A is an illustration of a schematic diagram of an assembly for loading and transporting a sample liquid, while minimizing spilling of the sample liquid, in accordance with an embodiment.

FIG. 1B is an illustration of a schematic diagram of an assembly for loading and transporting a sample liquid, while minimizing spilling of the sample liquid, in accordance with an embodiment.

DETAILED DESCRIPTION

Figure 2A:
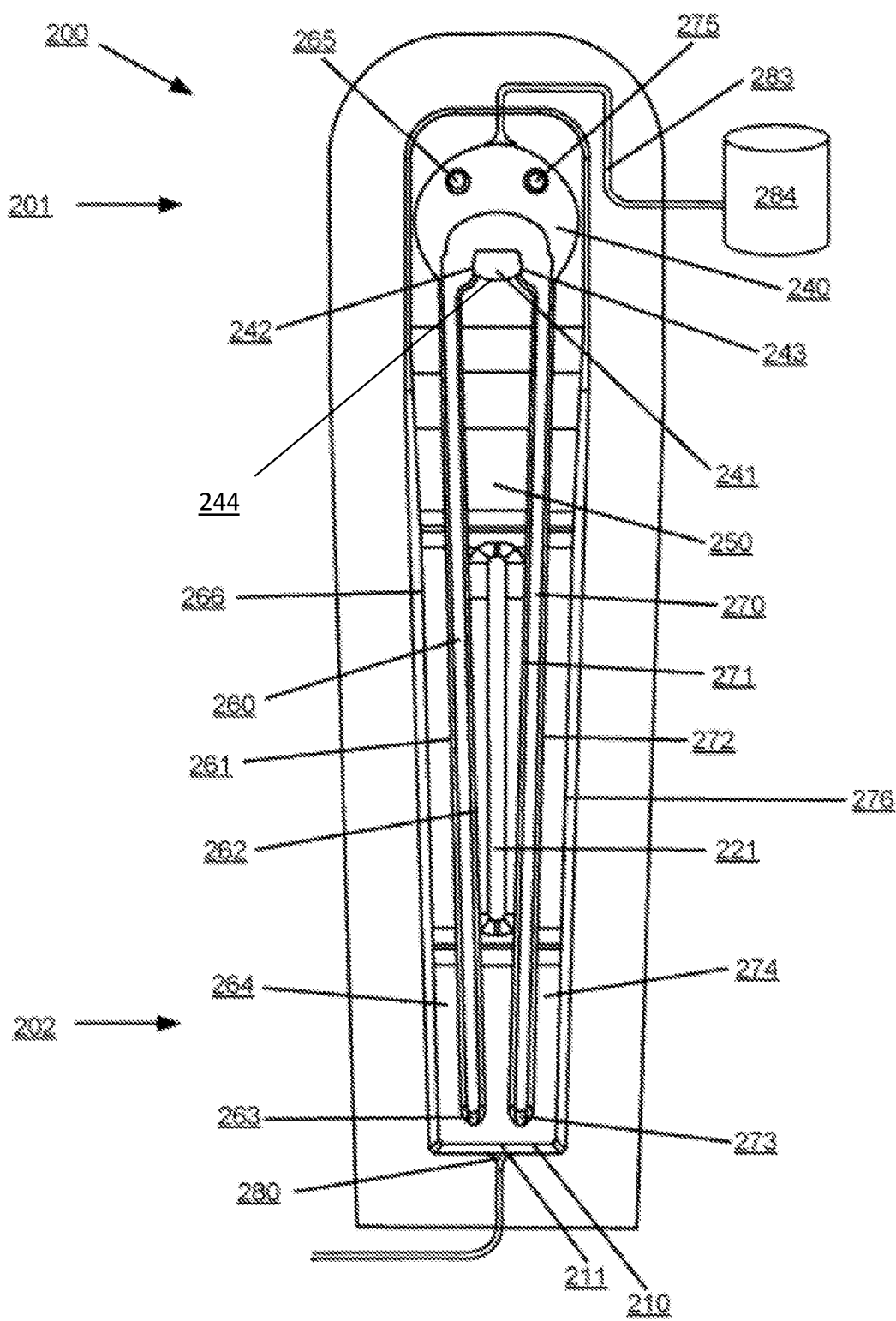
FIG. 2A is an illustration of a wire diagram of an assembly for loading and transporting a sample liquid, while minimizing spilling of the sample liquid, in accordance with an embodiment.

Systems, devices, and methods for loading a sample liquid into an entry port of an assembly, and transferring the loaded sample liquid from the entry port into a reservoir of the assembly, while minimizing spilling of the sample liquid from the assembly, are provided herein. The devices disclosed herein include an entry port and a reservoir. The entry port is located at a proximal region of the device and comprises an inlet and a gas vent. The reservoir comprises a distal wall, a fin, and a continuous fluidic pathway. The distal wall is located at a distal region of the device. The fin extends from the inlet of the entry port towards the distal wall. The continuous fluidic pathway comprises a converging channel and a diverging channel. The converging channel is defined in part by a first surface of the fin, and is in fluidic communication with the inlet of the entry port. The first diverging channel is defined in part by a second surface of the fin, and is in fluidic communication with the gas vent of the entry port. At a distal end of the fin, a width of the converging channel is substantially equivalent to, or less than, a width of the first diverging channel, and a distance between the distal end of the fin and the distal wall is substantially equivalent to, or less than, the width of the converging channel at the distal end of the fin. In some embodiments, the methods disclosed herein include introducing a sample liquid into the entry port of the device, whereupon the sample liquid is drawn through the inlet of the entry port and into the converging channel of the assembly. When the sample liquid enters the converging channel, the sample liquid is drawn toward the distal region of the assembly. Once in the distal region of the assembly, the sample liquid flows into the first diverging channel. The dimensions of the first diverging channel retard the flow of the sample liquid further into the first diverging channel, thereby concentrating the sample liquid at the distal region of the assembly.

Before the disclosed embodiments are described in greater detail, it is to be understood that this disclosure is not limited to particular embodiments described, as such can, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the present disclosure. The upper and lower limits of these smaller ranges can independently be included in the smaller ranges and are also encompassed within the present disclosure, subject to any specifically excluded limit in the stated range. Where the stated range includes one or both of the limits, ranges excluding either or both of those included limits are also included in the present disclosure.

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Unless defined otherwise, all technical and scientific terms used herein have the same meaning as commonly understood by one of ordinary skill in the art to which these disclosed embodiments belong. Although any methods and materials similar or equivalent to those described herein can also be used in the practice or testing of the disclosed embodiments, representative illustrative methods and materials are now described. Any recited method can be carried out in the order of events recited or in any other order which is logically possible.

It is noted that, as used herein and in the appended claims, the singular forms "a," "an," and "the" include plural referents unless the context clearly dictates otherwise.

Systems

Included in the disclosure are systems, devices, and methods for loading a sample liquid into an entry port of an assembly, and transferring the loaded sample liquid from the entry port into a reservoir of the assembly, while minimizing spilling of the sample liquid from the assembly. Systems according to the subject embodiments include an assembly that comprises an entry port and a reservoir used in conjunction with one another to load and transport a sample liquid.

FIGS. 1A and 1B are illustrations of a schematic diagram of an assembly for loading and transporting a sample liquid, while minimizing spilling of the sample liquid, in accordance with an embodiment. Specifically, as discussed in further detail below, FIG. 1A depicts an assembly that comprises a single fin, a single converging channel, a single diverging channel, and a single gas vent, in accordance with an embodiment, while FIG. 1B depicts an assembly that comprises a single converging channel, two fins, two diverging channels, and two gas vents, in accordance with an embodiment. In alternative embodiments, an assembly may comprise any number of fins, converging channels, diverging channels, and/or gas vents.

The assembly 100 depicted in FIG. 1A includes a proximal region 101 and a distal region 102. An entry port 140 is located at the proximal region of the assembly. A reservoir extends throughout the proximal and distal regions of the assembly, as described in detail below. In some embodiments, the reservoir of the assembly holds a volume of up to 10 milliliters. In a preferred embodiment, the reservoir of the assembly holds a volume of up to 5 milliliters. In a further preferred embodiment, the reservoir of the assembly holds a volume of up to 2.5 milliliters.

The entry port of the assembly is configured to receive a sample liquid. In some particular embodiments, the entry port is configured to receive a sample liquid from a pipette. The entry port comprises an inlet 141 and a gas vent 165. The inlet defines an opening of the entry port, and comprises a first lateral edge 142 and a second lateral edge 143. The gas vent defines another opening of the entry port. Both the inlet and the gas vent are discussed in further detail below.

The reservoir of the assembly comprises a distal wall 110, a fin 160, and a continuous fluidic pathway. The distal wall of the reservoir is located at the distal region of the assembly.

The fin extends from a lateral edge of the inlet of the entry port towards the distal wall. The fin and the lateral edge of the inlet of the entry port are contiguous such that there is no gap between the entry port and the fin. The fin comprises a first surface 161 and a second surface 162. As shown in FIG. 1A, the fin extends towards the distal wall, but does not contact the distal wall, such that a distance exists between the distal wall and a distal end 163 of the fin. The distal end of the fin is the portion of the fin that is closest in proximity to the distal wall.

As shown in FIG. 1A, the first surface of the fin is opposite the second surface of the fin. In some embodiments, such as the embodiment shown in FIG. 1A, the fin increases in thickness as a distance from the entry port increases. In other words, a distance separating the first surface and the second surface of the fin can increase as a distance from the entry port increases. Alternatively, the thickness of the fin can be constant along its length, decrease as a function of distance from the inlet, or vary so long as variability in the thickness does not disrupt the converging or diverging character of the channels.

The continuous fluidic pathway of the reservoir comprises a converging channel 150 and a diverging channel 164. The converging channel of the continuous fluidic pathway is in fluidic communication with the inlet of the entry port, and is defined in part by the second surface of the fin. Because there is no gap between the entry port and the fin as described above, a sample liquid flowing out of the entry port via the inlet flows directly into the converging channel.

As depicted in FIG. 1A, the converging channel narrows as a distance from the entry port increases. In other words, as the distance from the entry port increases, the width of the converging channel decreases. In some embodiments, the width of the converging channel decreases linearly as a function of increasing distance from the entry port.

The diverging channel of the continuous fluidic pathway is defined in part by the first surface of the fin. The diverging channel is in fluidic communication with the gas vent of the entry port.

As depicted in FIG. 1A, the diverging channel widens as the distance from the distal wall increases. In other words, as the distance from the distal wall increases, a width of the diverging channel increases. In some embodiments, the width of the diverging channel increases linearly as a function of increasing distance from the distal wall.

At the distal end of the fin, the width of the converging channel is substantially equivalent, or less than, to the width of the diverging channel. Furthermore, the distance between the distal end of the fin and the distal wall is substantially equivalent to, or less than, the width of the converging channel at the distal end of the fin. As used herein, values being "substantially equivalent" means that the values differ by no more than +/−25%. The substantial equivalence of the width of the converging channel and the width of the diverging channel at the distal end of the fin neutralizes the forces between the converging channel and the diverging channel at the distal region of the assembly, such that a sample liquid can concentrate at the distal region of the assembly, as discussed in further detail below.

As noted above, a distance exists between the distal wall of the reservoir and the distal end of the fin. This distance between the distal wall and the distal end of the fin in part defines a distal portion of the reservoir that is not a part of the converging channel or the diverging channel. This distal portion of the reservoir fluidically connects the converging channel and the diverging channel, which are located on opposite sides of the fin. In other words, a sample liquid can flow from the converging channel around the distal end of the fin and into the diverging channel via a distal portion of the reservoir.

In addition to the distal portion of the reservoir, the reservoir typically also comprises a proximal portion. The proximal portion of the reservoir begins where the diverging channel ends at the proximal region of the assembly. Specifically, the proximal portion of the reservoir begins where the diverging channel ceases to diverge, and extends towards the proximal end of the assembly. The proximal portion of the reservoir is not a part of the diverging channel, but rather is in fluidic communication with the diverging channel. As seen in FIG. 1A, the proximal portion of the reservoir is bounded in part by a surface of the entry port.

As briefly discussed above, the diverging channel is in fluidic communication with the gas vent of the entry port. In some embodiments, this fluidic communication between the diverging channel and the gas vent is direct such that the diverging channel and the gas vent are directly connected. In alternative embodiments, this fluidic communication between the diverging channel and the gas vent is indirect such that the diverging channel and the gas vent are indirectly connected via a proximal portion of the reservoir. More specifically, in embodiments in which the diverging channel and the gas vent are in indirect fluidic communication, the gas vent may be directly connected to the proximal portion of the reservoir, which is in turn connected to the diverging channel. Embodiments in which a gas vent is in direct and in indirect fluidic communication with a diverging channel are discussed in further detail below.

In some embodiments, such as the embodiment in FIG. 1A, the assembly further comprises a first lateral wall 166 that extends from the proximal region of the assembly to the distal wall, such that the first lateral wall contacts the distal wall. In such embodiments, the first lateral wall further defines, in part, the diverging channel, the distal portion of the reservoir, and the proximal portion of the reservoir. Optionally, the first lateral wall does not contact a side of the entry port, such that the diverging channel is fluidically connected to the proximal portion of the reservoir as described above.

In some embodiments, the assembly further comprises a second lateral wall 176 that extends from the proximal region of the assembly to the distal wall, such that the second lateral wall contacts the distal wall. In embodiments in which the assembly comprises a single converging channel, a single fin and a single diverging channel, such as the embodiment depicted in FIG. 1A, the second lateral wall further defines the converging channel and the distal portion of the reservoir.

In some embodiments, such as the embodiment depicted in FIG. 1A, the assembly comprises a single converging channel, a single fin, a single diverging channel, and a single gas vent. In alternative embodiments, the assembly can further comprise multiple fins, multiple diverging channels, and/or multiple gas vents. For example, FIG. 1B is an illustration of a schematic diagram of an assembly that comprises a single converging channel, two fins, two diverging channels, and two gas vents, in accordance with an embodiment. Except for the proximal portion of the reservoir and the second lateral wall, the assembly depicted in FIG. 1B can be partly described in the same way as the assembly depicted in FIG. 1A. However, as described in detail below, the assembly of FIG. 1B further comprises additional elements not comprised within the assembly of FIG. 1A.

Turning first to the entry port of the assembly depicted in FIG. 1B, the entry port comprises a second gas vent 175 in addition to the first gas vent. Like the first gas vent, the second gas vent defines an opening of the entry port. As discussed in further detail below, while the second gas vent is necessary to maintain proper functioning of the assembly depicted in FIG. 1B, in alternative embodiments, depending upon the configuration of the proximal portion of the reservoir, inclusion of more than one gas vent in the assembly may be optional.

Turning next to the reservoir of the assembly of FIG. 1B, the reservoir further comprises a second fin 170. The second fin extends from the second lateral edge of the inlet of the entry port towards the distal wall. The second fin and the second lateral edge of the inlet of the entry port are contiguous such that there is no gap between the entry port and the second fin. Similar to the first fin, the second fin comprises a first surface 171, and a second surface 172. As shown in FIG. 1B, the second fin extends towards the distal wall, but does not contact the distal wall, such that a distance exists between the distal wall and a distal end 173 of the second fin. The distal end of the second fin is the portion of the second fin that is closest in proximity to the distal wall.

In some embodiments, the first fin and the second fin are located a substantially equivalent distance from a center point 111 of the distal wall. In further embodiments, a length of the first fin is substantially equivalent to a length of the second fin. As used herein, values being "substantially equivalent" means that the values differ by no more than +/−25%.

Rather than the second lateral wall defining the converging channel as described above with regard to FIG. 1A, as seen in FIG. 1B, the first surface of the second fin further defines the converging channel. Because there is no gap between the entry port and the second fin as described above, a sample liquid flowing out of the entry port via the inlet flows directly into the converging channel.

As shown in FIG. 1B, the first surface of the second fin is opposite the second surface of the second fin. In addition to the converging channel and the first diverging channel, the continuous fluidic pathway of the assembly of FIG. 1B also comprises a second diverging channel 174. The second diverging channel of the continuous fluidic pathway of FIG. 1B is defined in part by the second surface of the second fin. As discussed in further detail below, the second diverging channel is either in direct fluidic communication with the second gas vent of the entry port, or in indirect fluidic communication with the second gas vent of the entry port via a proximal portion of the reservoir.

As depicted in FIG. 1B, the second diverging channel widens as a distance from the distal wall increases. At the distal end of the second fin, the width of the converging channel is substantially equivalent to, or less than, the width of the second diverging channel. As noted above, at the distal end of the first fin, the width of the converging channel is substantially equivalent to, or less than, the width of the first diverging channel. Therefore, at the distal end of the first and second fins, the width of the converging channel is substantially equivalent to, or less than, the widths of the first diverging channel and the second diverging channel. Furthermore, the distance between the distal end of the second fin and the distal wall is substantially equivalent to, or less than, the width of the converging channel at the distal end of the second fin. Therefore, the distances between the distal ends of the first and second fins and the distal wall are substantially equivalent to, or less than, the width of the converging channel at the distal ends of the first and second fins. As used herein, values being "substantially equivalent" means that the values differ by no more than +/−25%. The substantial equivalence of the widths of the converging channel, the first diverging channel, and the second diverging channel at the distal ends of the first and second fins neutralizes the forces between the converging channel and the two diverging channels at the distal region of the assembly, such that a sample liquid can concentrate at the distal region of the assembly, as discussed in further detail below.

As discussed above with regard to FIG. 1A, in embodiments of the assembly that comprise a single fin (i.e., the first fin) and a single diverging channel (i.e., the first diverging channel), the distal portion of the reservoir is defined in part by the distance between the distal end of the first fin and the distal wall. In embodiments of the assembly such as FIG. 1B that comprise two fins (i.e., the first fin and the second fin) and two diverging channels (i.e., the first diverging channel and the second diverging channel), the distal portion of the reservoir is further defined by the distance between the distal end of the second fin and the distal wall. In such embodiments, the distal portion of the reservoir is not a part of the converging channel, the first diverging channel, or the second diverging channel, but fluidically connects the converging channel to the first diverging channel and to the second diverging channel. In other words, a sample liquid can flow from the converging channel, around the distal end of the first fin, and into the first diverging channel, as well as around the distal end of the second fin and into the second diverging channel, via the distal portion of the reservoir.

As also discussed above with regard to FIG. 1A, in embodiments of the assembly that comprise a single fin (i.e., the first fin) and a single diverging channel (i.e., the first diverging channel), the first diverging channel may be in fluidic communication with a proximal portion of the reservoir. In embodiments of the assembly that comprise two fins (i.e., the first fin and the second fin) and two diverging channels (i.e., the first diverging channel and the second diverging channel), the two diverging channels may both be in fluidic communication with a shared proximal portion of the reservoir, or there may be two separate proximal portions of the reservoir such that each separate proximal portion of the reservoir is in fluidic communication with one of the two diverging channels.

Figure 2B:
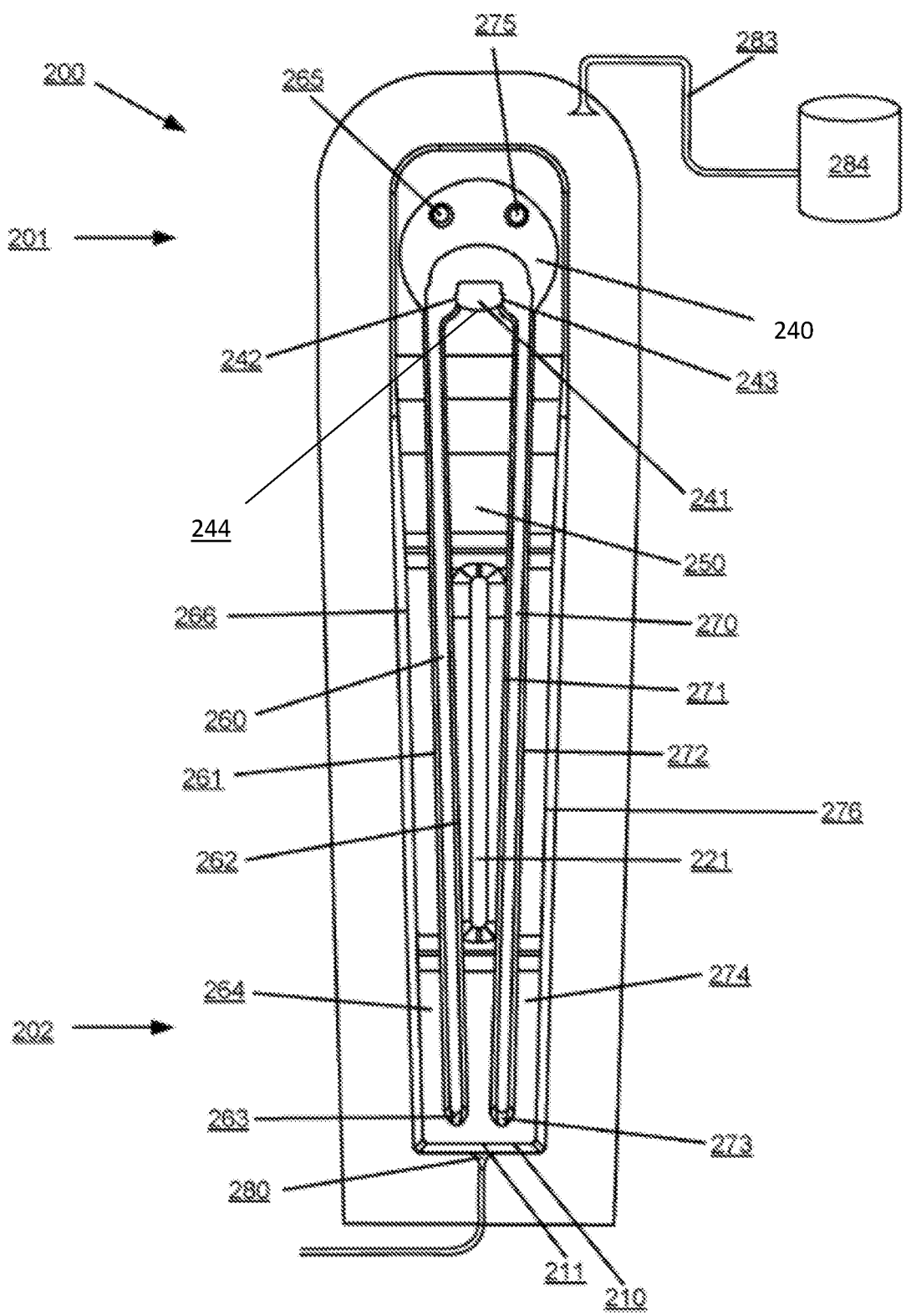
FIG. 2B is an illustration of a wire diagram of an alternate embodiment of an assembly for loading and transporting a sample liquid, while minimizing spilling of the sample liquid, in accordance with an embodiment.

Embodiments in which a shared proximal portion of the reservoir is in fluidic communication with the two diverging channels are depicted in FIGS. 2A and 2B. Specifically, as shown in FIGS. 2A and 2B, the proximal portion of the reservoir is in fluidic communication with both the first and second diverging channels. The proximal portion of the reservoir begins where the first and second diverging channels end at the proximal region of the assembly. Specifically, the proximal portion of the reservoir begins where the first and second diverging channels cease to diverge, and extends towards the proximal end of the assembly. The proximal portion of the reservoir is not a part of the first and second diverging channels, but rather is in fluidic communication with the first and second diverging channels. As seen in FIGS. 2A and 2B, the proximal portion of the reservoir is bounded in part by sides of the entry port.

In embodiments in which a shared proximal portion of the reservoir is in fluidic communication with multiple diverging channels (e.g., the first and second diverging channels), inclusion of more than one gas vent in fluidic communication with the multiple diverging channels is optional because gas can travel into and out of any of the multiple diverging channels via the shared proximal portion of the reservoir that in fluidic communication with a single gas vent. For example, while the embodiments of the assembly depicted in FIGS. 2A and 2B comprise two gas vents, because the first and second diverging channels are both in fluidic communication with the shared proximal portion of the reservoir, only one of these gas vents is necessary for functioning of the assembly. Specifically, if the second gas vent were eliminated from FIGS. 2A and 2B, gas would still be able to travel into and out of the second diverging channel via the shared proximal portion of the reservoir, which is in fluidic communication with the first gas vent. Additional gas vents, such as the second gas vent, may be optionally included in the assembly as a precaution, in case the first gas vent is obstructed such that gas is unable to travel through the first gas vent.

In addition to the optional inclusion of more than one gas vent in the assembly of FIGS. 2A and 2B, the gas vent(s) can either be in direct or indirect fluidic communication the diverging channel(s) because both of the diverging channels are in fluidic communication with a shared proximal portion of the reservoir. In other words, because both the first and the second diverging channels in FIGS. 2A and 2B are in fluidic communication with a shared proximal portion of the reservoir, the gas vent(s) can either be in direct fluidic communication with the diverging channel(s), or be in indirect fluidic communication with the diverging channel(s) via the proximal portion of the reservoir. With either placement of the gas vent(s), gas is able to travel into and out of both of the diverging channels via the shared proximal portion of the reservoir.

In alternative embodiments of the assembly, such as the embodiment depicted in FIG. 1B, a shared proximal portion of the reservoir is not in fluidic communication with the multiple diverging channels (e.g., the first diverging channel and the second diverging channel). Rather, multiple, separate proximal portions of the reservoir are each in fluidic communication with one or more of the multiple diverging channels. For example, in the embodiment depicted in FIG. 1B, the proximal portion of the reservoir that is in fluidic communication with the first diverging channel is not in fluidic communication with the second diverging channel due to the positioning of the entry port. Rather, as depicted in FIG. 1B, there are two separate proximal portions of the reservoir. Specifically, a first proximal portion of the reservoir is in fluidic communication with the first diverging channel, and a second proximal portion of the reservoir that is separate from the first proximal portion of the reservoir is in fluidic communication with the second diverging channel.

In embodiments in which one or more of multiple diverging channels are in fluidic communication with separate proximal portions of the reservoir, at least one gas vent is in fluidic communication with at least one diverging channel of the one or more diverging channels in fluidic communication with each separate proximal portion of the reservoir. In simpler terms, at least one gas vent is in fluidic communication with each separate proximal portion of the reservoir. This placement of gas vents enables gas to travel into and out of each diverging channel despite the separation of the proximal portions of the reservoir. For example, in the embodiment of the assembly depicted in FIG. 1B in which the first diverging channel is in fluidic communication with a first proximal portion of the reservoir, and the second diverging channel is in fluidic communication with a second proximal portion of the reservoir that is separate and distinct from the first proximal portion of the reservoir, a first gas vent is in fluidic communication with the first diverging channel and a second gas vent is in fluidic communication with the second diverging channel. Therefore, gas is able to travel into and out of both the first diverging channel and the second diverging channel.

The at least one gas vent in fluidic communication with the at least one diverging channel of the one or more diverging channels in fluidic communication with each separate proximal portion of the reservoir, can either be in direct or indirect fluidic communication the at least one diverging channel because the one or more diverging channels are all in fluidic communication with the separate proximal portion of the reservoir. For example, in FIG. 1B, the first and second gas vents can either be in direct fluidic communication with the first and second diverging channels, respectively, or be in indirect fluidic communication with the first and second diverging channels via the separate first and second proximal portions of the reservoir, respectively. If additional diverging channels were in fluidic communication with the first and/or the second proximal portions of the reservoir in FIG. 1B, with either placement of the first and second gas vents, gas would be able to travel into and out of all of the diverging channels via the first and second proximal portions of the reservoir.

Turning finally to the lateral wall of the reservoir of FIG. 1B, like the second lateral wall of the reservoir of FIG. 1A, the second lateral wall extends from the proximal region of the assembly to the distal wall, such that the second lateral wall contacts the distal wall. However, unlike the second lateral wall of the assembly of FIG. 1A, in FIG. 1B the second lateral wall further defines the second diverging channel, the distal portion of the reservoir, and a proximal portion of the reservoir. Optionally, the second lateral wall does not contact a side of the entry port, such that the second diverging channel is fluidically connected to the proximal portion of the reservoir.

Devices

FIG. 2A is an illustration of a wire diagram of an assembly 200 for loading and transporting a sample liquid, while minimizing spilling of the sample liquid, in accordance with an embodiment. The assembly 200 further comprises a first lateral wall 266 that extends from the proximal region of the assembly 201 to the distal wall 210, such that the first lateral wall 266 contacts the distal wall 210. The assembly 200 further comprises a second lateral wall 276 that extends from the proximal region of the assembly 201 to the distal wall 210, such that the second lateral wall 276 contacts the distal wall 210. The assembly of FIG. 2A comprises two fins (i.e., a first fin 260 and a second fin 270), two diverging channels (i.e., a first diverging channel 264 and a second diverging channel 274), and two gas vents (i.e., a first gas vent 265 and a second gas vent 275), like the assembly of FIG. 1B. The fin 260 comprises a first surface 261, a second surface 262 and a distal end 263. The fin 270 comprises a first surface 271, a second surface 272 and a distal end 273. The inlet 241 defines an opening of the entry port 240, and comprises a first lateral edge 242, a second lateral edge 243 and a bottom edge 244. Therefore, some of the above description of FIG. 1B also applies to FIG. 2A. However, as briefly discussed above with regard to FIG. 1B, unlike the assembly of FIG. 1B, the two diverging channels and the two gas vents of FIG. 2A are both in fluidic communication with a shared proximal portion of the reservoir. Additionally, FIG. 2A also depicts additional optional features of the assembly that are not depicted in FIG. 1B.

First, as briefly discussed above, the two diverging channels and two gas vents of FIG. 2A are both in fluidic communication with a shared proximal portion of the reservoir. However, as mentioned above, in embodiments in which a shared proximal portion of the reservoir is in fluidic communication with multiple diverging channels (e.g., the first and second diverging channels of FIG. 2A), inclusion of more than one gas vent in fluidic communication with the multiple diverging channels is optional. Therefore, while the embodiment of the assembly depicted in FIG. 2A comprises two gas vents, because the first and second diverging channels are both in fluidic communication with the shared proximal portion of the reservoir, only one of these gas vents is necessary for functioning of the assembly as described herein.

Turning to the additional, optional features of the assembly of FIG. 2A, first, the assembly depicted in FIG. 2A further comprises an exit port 280. The exit port is a fluid port that can be closed such that fluid is prevented from flowing through the exit port, or be opened such that fluid is able to flow through the exit port.

The exit port is located at the distal region 202 of the assembly. For example, as shown in FIG. 2A, the exit port may be located at or near the distal wall 210 of the assembly. In embodiments in which the assembly comprises two fins, such as the embodiment of the assembly shown in FIG. 2A, the exit port is preferably located a substantially equivalent distance from the first fin and the second fin. For example, in embodiments in which the first fin and the second fin are located a substantially equivalent distance from a center point 211 of the distal wall, in a preferred embodiment in which the exit port is located a substantially equivalent distance from the first fin and the second fin, the exit port may be located at the center point of the distal wall. As used herein, values being "substantially equivalent" means that the values differ by no more than +/−25%. However, in alternative embodiments, the exit port can be located at any alternative location at the distal region of the assembly. In further embodiments, the exit port can comprise a plurality of exit ports.

In addition to the exit port, the assembly depicted in FIG. 2A also comprises a gas conduit 283. The gas conduit is configured to supply the assembly with a gas. In some embodiments, the gas comprises air. Similar to the exit port, the gas conduit can be closed such that gas, or other fluid, is prevented from flowing through the gas conduit, or opened such that gas is able to flow through the gas conduit into the reservoir.

The gas conduit is located at the proximal region 201 of the assembly. Specifically, in some embodiments, such as the embodiment of FIG. 2A, the gas conduit is located at the proximal region of the assembly such that the gas conduit is in fluidic communication with the entry port 240. In such embodiments, the gas conduit is configured to deliver gas into the entry port. In embodiments, such as the embodiment of FIG. 2A, in which the assembly comprises one or more diverging channels in fluidic communication with a shared proximal portion of the reservoir, and thus at least one gas vent in fluidic communication with the shared proximal portion of the reservoir, upon entry of the gas into the entry port, the gas travels into the one or more diverging channels via the at least one gas vent in fluidic communication with the shared proximal portion of the reservoir, and into the converging channel 250 via the inlet 241. In alternative embodiments, such as the embodiment of FIG. 1B, in which the assembly comprises multiple diverging channels, with one or more of the multiple diverging channels in fluidic communication with separate proximal portions of the reservoir, and thus at least one gas vent in fluidic communication with each separate proximal portion of the reservoir, upon entry of the gas into the entry port, the gas travels into the one or more diverging channels in fluidic communication with each separate proximal portion of the reservoir via the at least one gas vent in fluidic communication with each separate proximal portion of the reservoir, and into the converging channel via the inlet.

In alternative embodiments, such as the embodiment discussed in further detail below with regard to FIG. 2B, the gas conduit can be located at the proximal region of the assembly such that the gas conduit is in fluidic communication with the proximal portion of the reservoir.

In even further embodiments not depicted herein, the gas conduit can be located at the proximal region of the assembly such that the gas conduit is in fluidic communication with the converging channel of the assembly at a location proximal to the inlet of the entry port. In a preferred embodiment of this placement of the gas conduit, the gas conduit enters the converging channel from a top wall of the assembly (described in further detail below with regard to FIG. 3) to avoid bubble formation when the assembly is rotated such that a length of the converging channel is parallel to gravity, and subsequently when gas is supplied into the assembly via the gas conduit (described in further detail below with regard to FIG. 5B). In such embodiments, upon entry of the gas into the converging channel via the gas conduit, the gas directly enters the converging channel, and travels into one or more diverging channels of the assembly via the inlet, the entry port, and the gas vent(s) that are in fluidic communication with one or more proximal portions of the reservoir.

In some embodiments, such as the embodiment depicted in FIG. 2A, the gas conduit is optionally in fluidic communication with a compressed gas source 284. The compressed gas source may comprise for example, a gas pump. In such embodiments, the pressurized gas source is configured to supply a gas to the gas conduit. The gas conduit then supplies the assembly with the gas as described above. In alternative embodiments, the gas conduit is not connected to the compressed gas source.

In some implementations, such as illustrated in FIG. 2A, the assembly can include a transparent viewing window 221 located in the reservoir. The transparent viewing window 221 is discussed in further detail below with regard to FIG. 3.

FIG. 2B is an illustration of a wire diagram of an alternate embodiment of an assembly for loading and transporting a sample liquid, while minimizing spilling of the sample liquid, in accordance with an embodiment. Except for the location of the gas conduit, the assembly depicted in FIG. 2B can be described in the same way as the assembly depicted in FIG. 2A.

Specifically, as briefly discussed above, and as seen in FIG. 2B, the gas conduit can be located at the proximal region of the assembly such that the gas conduit is in fluidic communication with the proximal portion of the reservoir. In such embodiments, the gas conduit is configured to deliver gas into the proximal portion of the reservoir. From there, in embodiments such as the embodiment of FIG. 2B in which the assembly comprises one or more diverging channels that are in fluidic communication with a shared proximal portion of the reservoir, and thus at least one gas vent in fluidic communication with the shared proximal portion of the reservoir, upon entry of the gas into the shared proximal portion of the reservoir, the gas travels into the one or more diverging channels via the fluidic connection between the shared proximal portion of the reservoir and the one or more diverging channels, and into the converging channel via the at least one gas vent in fluidic communication with the shared proximal portion of the reservoir, the entry port, and the inlet of the entry port. In alternative embodiments, such as the embodiment of FIG. 1B, in which the assembly comprises multiple diverging channels, with one or more of the multiple diverging channels in fluidic communication with separate proximal portions of the reservoir, and thus at least one gas vent in fluidic communication with each separate proximal portion of the reservoir, upon entry of the gas into the entry port, when the gas enters one of the separate proximal portions of the reservoir via the gas conduit, the gas travels into the one or more diverging channels in fluidic communication with the one separate proximal portion of the reservoir via the fluidic communication between the one separate proximal portion of the reservoir and the one or more diverging channels. Then, to travel into the one or more diverging channels in fluidic communication with the other separate proximal portion(s) of the reservoir, the gas travels into the entry port via the at least one gas vent in fluidic communication with the one separate proximal portion of the reservoir, into the other separate proximal portion(s) of the reservoir via the at least one gas vent in fluidic communication with each of the other separate proximal portion(s) of the reservoir, and into the one or more diverging channels in fluidic communication with the other separate proximal portion(s) of the reservoir via the fluidic connection(s) between the one or more diverging channels and the other separate proximal portion(s) of the reservoir. Finally, to travel into the converging channel, the gas travels through the inlet of the entry port into the converging channel.

Figure 3:
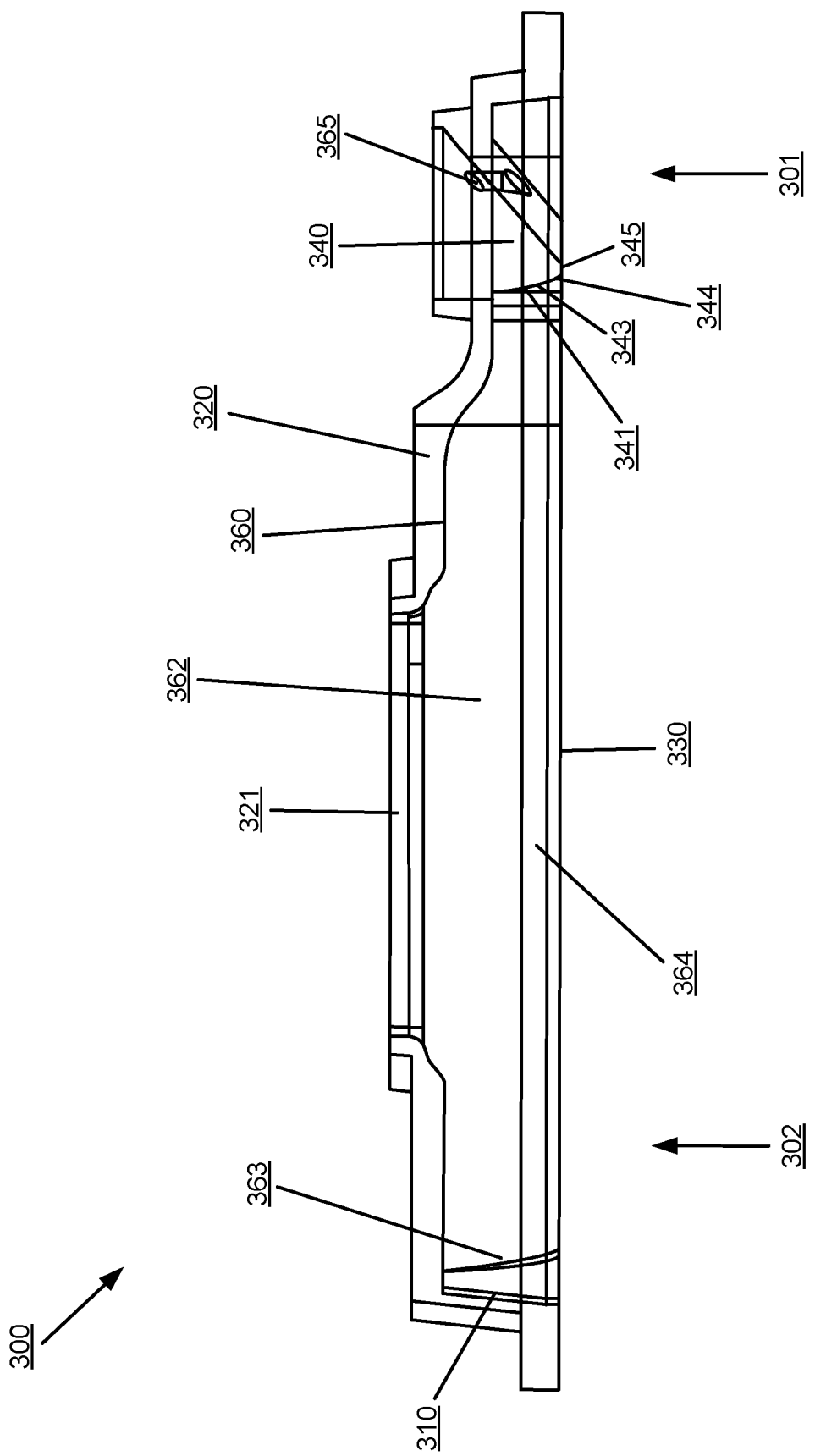
FIG. 3 is a profile view of a wire diagram of an assembly for loading and transporting a sample liquid, while minimizing spilling of the sample liquid, in accordance with an embodiment.

FIG. 3 is a profile view of a wire diagram of an assembly 300 for loading and transporting a sample liquid, while minimizing spilling of the sample liquid, in accordance with an embodiment. Specifically, FIG. 3 depicts an embodiment of the assembly 300 that comprises at least a first fin 360, a second surface of the first fin 362, a first diverging channel 364, and a first gas vent 365. The assembly may also comprise a second fin, a second diverging channel, and/or a second gas vent. In addition to these features described above with regard to FIGS. 1A-2B, FIG. 3 also depicts additional optional features of the assembly that are not depicted in FIGS. 1A-2B.

First, the assembly depicted in FIG. 3 further comprises a top wall 320. The top wall extends between the proximal region of the assembly 301 and the distal wall 310. The top wall bounds, in part, the reservoir of the assembly, but provides an opening allowing access to the entry port. As discussed above, in embodiments in which the assembly comprises a single fin and a single diverging channel, the reservoir of the assembly comprises the distal wall, the first fin, and the continuous fluidic pathway, which in turn comprises the converging channel 350 and the first diverging channel. Therefore, in embodiments in which the assembly comprises a single fin and a single diverging channel, the top wall bounds, at least in part, the distal wall, the first fin, the converging channel, and the first diverging channel. On the other hand, in embodiments in which the assembly comprises two fins and two diverging channels, the reservoir of the assembly comprises the distal wall, the first fin, the second fin, and the continuous fluidic pathway, which in turn comprises the converging channel, the first diverging channel, and the second diverging channel. Therefore, in embodiments in which the assembly comprises two fins and two diverging channels, the top wall bounds, at least in part, the distal wall, the first fin, the second fin, the converging channel, the first diverging channel, and the second diverging channel.

In some embodiments, such as the embodiment depicted in FIG. 3, the continuous fluidic pathway also occupies the proximal portion of the reservoir and/or the distal portion of the reservoir. In those embodiments in which the continuous fluidic pathway also occupies the proximal portion of the reservoir and/or the distal portion of the reservoir, the top wall also bounds the proximal portion of the reservoir and/or the distal portion of the reservoir.

In certain embodiments, the top wall contacts the fin, thereby preventing a sample liquid contained within the assembly from flowing over the fin between a converging channel and diverging channel. In further embodiments in which the assembly comprises more than one fin, the top wall may also contact each fin, or contact a subset of the additional fin(s). However, in alternative embodiments, as discussed in further detail below, the assembly still functions as described herein when top wall does not contact one of more of the fins.

In some embodiments of the assembly, such as those shown in FIGS. 2A, 2B, and 3, a portion of the top wall comprises a transparent viewing window 321. The transparent viewing window is located above the reservoir such that contents of one or more channels are visible from outside of the assembly. Specifically, as discussed in further detail below with regard to FIGS. 6A-C, the transparent viewing window allows a user of the assembly to monitor a height of a sample liquid in the channels during evacuation of the sample liquid from the reservoir. In some embodiments, the transparent viewing window may comprise multiple transparent viewing windows, each located above a different channel of the reservoir such that that contents of the channels are visible from outside of the assembly. In a preferred embodiment, the transparent viewing window is flush or recessed from a surface of a fluidic device in which the assembly is incorporated.

In addition to the top wall, the assembly depicted in FIG. 3 also comprises a base 330. In some embodiments, the base comprises a thin film. The base spans the reservoir between the proximal region of the assembly, and the distal wall. The base can bound, in part, the entry port 340 and the reservoir of the assembly. Specifically, in some embodiments, the base bounds, at least in part, a bottom edge 344 of the inlet 341 of the entry port. In further embodiments, the base may bound, at least in part, a bottom surface 345 of the entry port. FIG. 3 also shows the second lateral edge 343 of inlet 341.

As discussed above, in embodiments in which the assembly comprises a single fin and a single diverging channel, the reservoir of the assembly comprises the distal wall, the first fin, and the continuous fluidic pathway, which in turn comprises the converging channel and the first diverging channel. Therefore, in embodiments in which the assembly comprises a single fin and a single diverging channel, the base bounds, at least in part, the distal wall, the first fin, the converging channel, and the first diverging channel. On the other hand, in embodiments in which the assembly comprises a two fins and two diverging channels, the reservoir of the assembly comprises the distal wall, the first fin, the second fin, and the continuous fluidic pathway, which in turn comprises the converging channel, the first diverging channel, and the second diverging channel. Therefore, in embodiments in which the assembly comprises two fins and two diverging channels, the base bounds, at least in part, the distal wall, the first fin, the second fin, the converging channel, the first diverging channel, and the second diverging channel.

In some embodiments, such as the embodiment depicted in FIG. 3, the continuous fluidic pathway also occupies the proximal portion of the reservoir and/or the distal portion of the reservoir. Therefore, in such embodiments in which the continuous fluidic pathway also occupies the proximal portion of the reservoir and/or the distal portion of the reservoir, the base also bounds, in part, the proximal portion of the reservoir and/or the distal portion of the reservoir.

In addition to depicting these additional optional features of the assembly, FIG. 3 also depicts relative heights of features of the assembly. Specifically, FIG. 3 depicts relative heights of the entry port, the inlet, and the first fin. Because the first fin in part defines the reservoir, the height of the reservoir can be inferred to be sat least as tall as the height of the first fin.

As shown in FIG. 3, the height of a fin, and thus the height of the reservoir, can vary along the length of the fin. However, in a preferred embodiment, as shown in FIG. 3, the reservoir is taller at the distal end 363 of the first fin than at the inlet of the entry port. In other words, in a preferred embodiment, the height of the reservoir is lower at the inlet relative to the distal portion of the reservoir. This decreased height of the reservoir at the inlet relative to the distal portion of the reservoir is desirable because, as discussed below with regard to FIG. 4, in some embodiments it may be desirable to cap the entry port of the assembly with a cap such that the capped entry port is flush or even recessed from a surface of a fluidic device in which the assembly is incorporated. In other words, by decreasing the height of the reservoir at the inlet relative to the distal portion of the reservoir, when the entry port is capped, the capped entry port does not extrude past a surface of a fluidic device in which the assembly is incorporated, but is rather flush, or even recessed, from the surface of the fluidic device. Similarly, in certain implementations, the exterior of the window is flush with, or recessed from, the top of the device.

However, this preferred embodiment of the assembly in which the height of a reservoir is lower at the inlet relative to the distal portion of the reservoir poses problems to the functioning of an assembly that lacks the converging and diverging channels of the invention. Specifically, when a sample liquid is loaded into the entry port of an assembly that lacks the converging and diverging channels of the invention, and in which the height of the reservoir is lower at the inlet relative to the distal portion of the reservoir, the loaded sample liquid may quickly fill the entry port, and in some cases overflow and spill from the entry port due to this decreased height, and therefore a decreased volume, of the proximal end of the reservoir.

To avoid spilling during loading of the sample liquid, and to maximize the volume that can be loaded into an assembly of limited dimensions, the fluidic pathways (e.g., the converging channel and the diverging channel(s)) of the assembly are configured such that the width of each fluidic pathway decreases towards the distal portion of the reservoir. As a result of this decreasing width of the fluidic pathways distally of the inlet, when a sample liquid is loaded into the entry port of the assembly, the sample liquid is quickly drawn from the inlet of the entry port toward the distal portion of the reservoir by the combined forces of capillary action and gravity. Therefore, despite the decreased height and the decreased volume of the reservoir at the proximal end, the entry port does not overflow with the sample liquid.

In one embodiment of the assembly, the assembly comprises an entry port and a continuous fluidic pathway. As discussed above, the entry port is located at a proximal region of the assembly, and comprises an inlet and a gas vent. Both the inlet and the gas vent define openings within the entry port. A continuous fluidic pathway extends from the inlet of the entry port to the gas vent of the entry port. More specifically, a first end of the continuous fluidic pathway is in fluidic communication with the inlet of the entry port and a second end of the continuous fluidic pathway is in fluidic communication with the gas vent of the entry port. The continuous fluidic pathway progressively narrows from the inlet toward a position distal to the inlet. The continuous fluidic pathway also progressively narrows from the gas vent towards the position distal to the inlet. Optionally, this embodiment of the assembly comprises a cap to seal the entry port, and thereby create a closed system.

In addition to the embodiment discussed above in which the reservoir is taller at the distal portion of the reservoir than at the inlet of the entry port, in a further preferred embodiment, at the inlet of the entry port, the converging channel is taller than the inlet. In an even further preferred embodiment, at least a portion of the converging channel is at least twice as tall as the inlet of the entry port. Finally, in an even further preferred embodiment, the width of the converging channel at the inlet is less than the height of the inlet.

In many existing microfluidic devices, the speed at which a sample liquid can be drawn into the device is increased by increasing the wettability of the device, by manufacturing the device to comprise hydrophilic surfaces. For example, in some embodiments, the sample loading device may be manufactured to comprise a hydrophilic material. In further embodiments, surfaces of the sample loading device may be treated with a hydrophilic treatment. Such treatment is unnecessary for the present assemblies and methods to function.

Despite this tendency in the field to manufacture sample loading devices to comprise hydrophilic surfaces, in some embodiments, the assembly disclosed herein comprises a hydrophobic material. For example, in some embodiments, the assembly can comprise one or more thermoplastic materials. Such materials can include acrylonitrile butadiene styrene (ABS), acrylic, such as poly(methyl methacrylate) (PMMA), polyoxymethylene (POM), also known as acetal, polyacetal and polyformaldehyde, aliphatic or semi-aromatic polyamide (PA), polyethylene (PE), polypropylene (PP), polyetheretherketone (PEEK), cyclic olefin copolymer (COC), cyclic olefin polymer (COP), polycarbonate (PC), and blends thereof. In embodiments in which the assembly comprises a hydrophobic material, the contact angle between water and a surface of the assembly may be between 90 and 120 degrees. Specifically, in embodiments in which the assembly comprises a hydrophobic material, the contact angle between water and a surface of the reservoir of the assembly (e.g., the converging channel, the fin(s), the diverging channel(s), the base, the top wall, the distal wall, the lateral wall(s), the transparent viewing window, etc.) may be between 90 and 120 degrees. In such embodiments, despite the hydrophobicity of the assembly, sample liquid can still be loaded into the assembly and drawn toward the distal region of the assembly without spilling of the sample liquid.

While not absolutely necessary for operation of the assemblies described herein, in certain implementations, the inlet can comprise a hydrophilic wick to prevent the inlet from acting as a capillary stop. In one embodiment, the wick is made of a hydrophilic non-porous material such as PVDF (polyvinylidenefluoride), PVA(polyvinyl aetate), PVOH (polyvinyl alcohol), PPO (polyphenyleneoxide), PEI (polyethyleneimine), paper, cellulose, or Nylon. Preferably, the wick is approximately as wide as the center channel, and ideally runs from the sample entry port to the point where it is barely sticking into the inlet. This arrangement of the wick will shuttle fluid along the length of the sample entry port toward and through the inlet at which point the fluid is drawn toward the distal wall by action of the converging channel. Such an arrangement would permit a user to drop fluid onto the wick rather than requiring the user to properly position the pipette tip at the inlet.

In another embodiment comprising a hydrophilic wick at the inlet, a hydrophilic material, such as PVDF, PVA, PPO, PEI, agarose, PLA (polylactic acid), PEG (polyethylene glycol), PEO (polyethylene oxide) or Nylon, is layered onto the assembly such that the hydrophilic material bridges the gap from the sample input well to the beginning of the converging section of the sample input port. The hydrophilic material can be drop cast to form this layer by dissolving the hydrophilic material in an appropriate solvent, i.e., any solvent that can dissolve the polymer but not hydrophobic material of the main assembly body. Once dissolved, a drop is deposited at the inlet to form a layer of the hydrophilic material upon removal, e.g. by evaporation, of the solvent. Such an embodiment similarly would permit the user to drop fluid anywhere on the sample entry port rather than positioning a pipette over the inlet to the reservoir. In certain implementations, this layer of hydrophilic material may be dissolvable is the typical sample solution. Exemplary dissolvable hydrophilic materials include sugars or gating films. Presence of the dissolvable hydrophilic material at the start of filling would enhance flow of the sample from the entry port through the inlet. However after filling is complete, the hydrophilic material has been dissolved and removed by the flow of the sample, reinstituting the ability of the inlet to act as a capillary stop preventing loaded fluid from exiting the reservoir after filling, thus avoiding an accidental spill during handling of the filled assembly.

Figure 4:
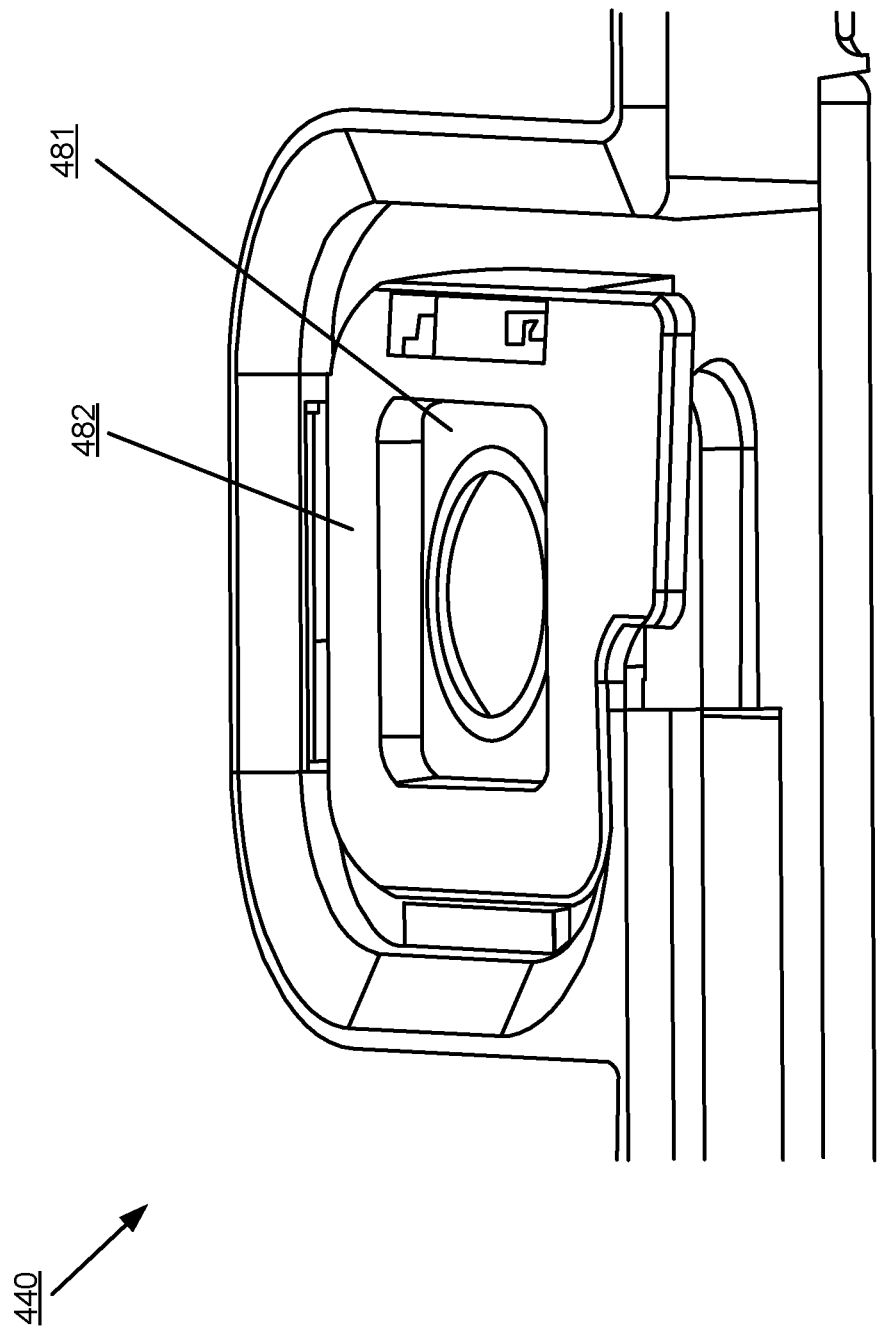
FIG. 4 is a three-dimensional illustration of an entry port, in accordance with an embodiment.

FIG. 4 is a three-dimensional illustration of a cap covering an entry port 440, in accordance with an embodiment. Specifically, FIG. 4 depicts an entry port that is sealed with a cap 481, in accordance with an embodiment. In some implementations, the cap can be configured to resist opening after the entry port is sealed.

When the cap is in place such that the entry port is capped, the cap seals the entry port such that fluid (i.e., gas and liquid) is prevented from exiting the assembly via the entry port, and such that fluid is prevented from entering the entry port from outside of the assembly. However, note that capping the entry port does not prevent fluid from traveling into and out of the entry port from within the assembly. Specifically, a described above, the entry port comprises an inlet 441 and at least one gas vent (e.g., a first gas vent 465 and a second gas vent 475). Therefore, the cap is configured to seal the at least one gas vent of the entry port such that fluid (such as gas) cannot exit the assembly via the at least one gas vent. However, fluid from the entry port can travel into and out of one or more diverging channels (e.g., a first diverging channel 464 and a second diverging channel 474) via the at least one gas vent and in some embodiments, one or more proximal portions of the reservoir. Similarly, fluid from the entry port can travel into and out of the converging channel 450 via the inlet of the entry port.

When the cap is not closed over the entry port such that the entry port is not capped, the entry port is unsealed, permitting fluid to enter or exit the assembly via the entry port. Specifically, when the cap is separate from the entry port such that the entry port is not sealed, fluid (e.g., gas) from the one or more diverging channels is able to exit the entry port via the at least one gas vent. Fluid (e.g., sample liquid) can also be loaded in to the entry port when the cap is removed from the entry port such that the entry port is not sealed.

As briefly discussed above with regard to FIG. 3, in some embodiments, the assembly, including the entry port depicted in FIG. 4, is a part of a fluidic device. In such embodiments, when the cap is in place such that the entry port is sealed, a top 482 of the cap may be recessed from a surface of the fluidic device, as shown in FIG. 4. In alternative embodiments, when the cap is in place such that the entry port is sealed, the top of the cap may be flush with the surface of the fluidic device.

Therefore, in certain embodiments, the novel devices described herein are configured such that the first location of the fluidic device, e.g., the entry port, at which the sample liquid is loaded into the fluidic device, is flush, or even recessed, with respect to the rest of the fluidic device. By configuring the fluidic devices such that the first location of the fluidic device is flush or recessed from the rest of the fluidic device, the fluidic device can easily be incorporated into a larger consumable device, such as a lab-on-a-chip device.

In embodiments of existing fluidic devices in which the first location of the fluidic device is flush or recessed from the rest of the fluidic device, when a sample liquid is loaded into the fluidic device at the first location, the loaded sample liquid may overflow and spill from the fluidic device. Not only does this spilling of the sample liquid contaminate the environment surrounding the fluidic device, but in embodiments in which the sample liquid comprises a biologically hazardous material, spilling of the sample liquid also poses a safety concern. Furthermore, as discussed above, spilling of the sample liquid results in loss of the sample liquid, which can be detrimental in embodiments in which a precise volume of the sample liquid is needed to generate reliable assay results. To combat these problems and avoid spilling of the sample liquid from the fluidic device, the novel fluidic devices described herein are further configured draw the sample liquid from the first location of the fluidic device to the alternative location of the fluidic device at a velocity such that such that the fluidic device does not overflow with the sample liquid. This improves upon the safety and ease-of-use of the fluidic device, as well as improves upon the reliability of assay results generated by the fluidic device.

Methods

Figure 5A:
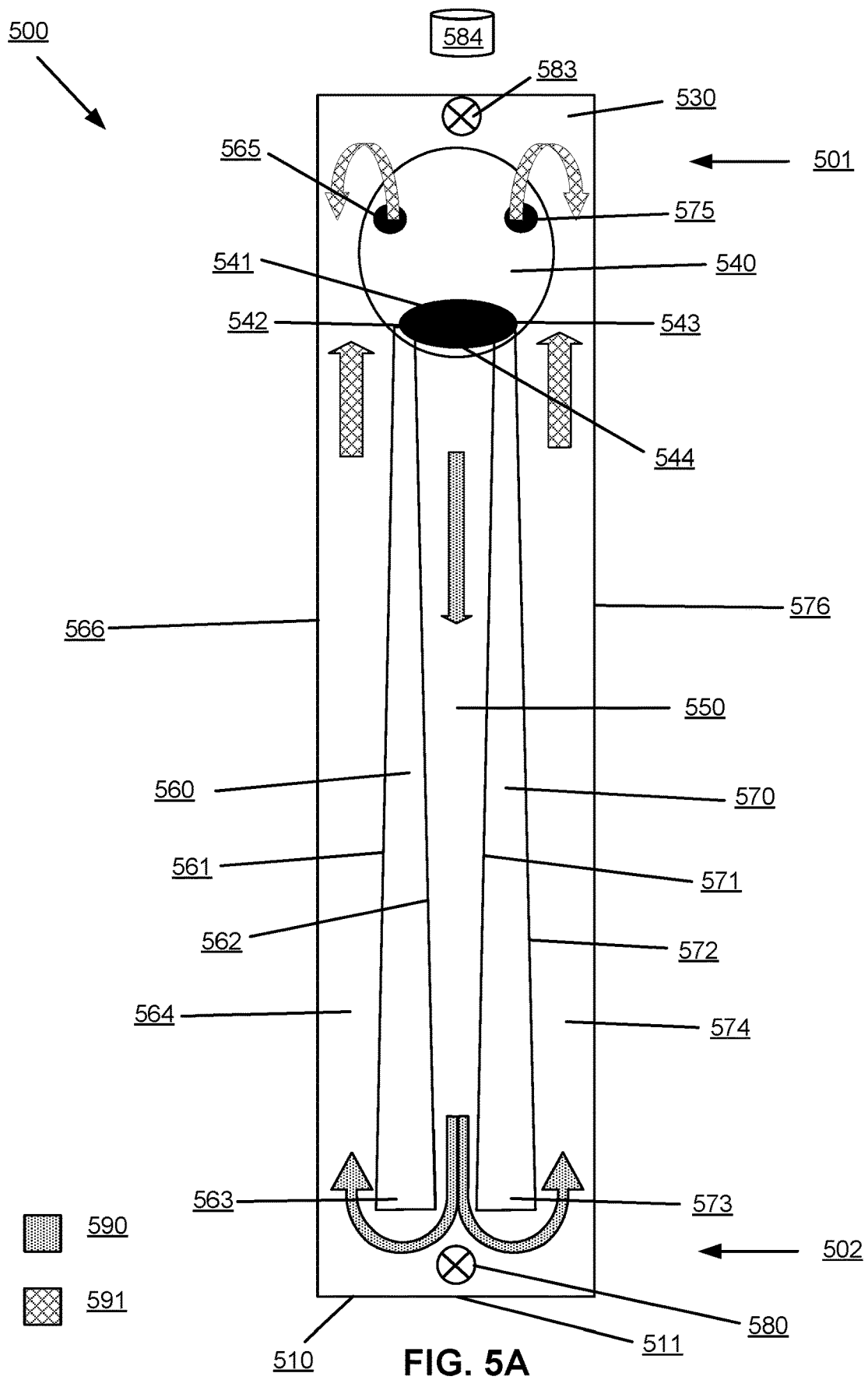
FIG. 5A illustrates a first step of the exemplar method of loading the sample liquid into the assembly and transporting the sample liquid within the assembly, while minimizing spilling of the sample liquid, in accordance with an embodiment.
Figure 5B:
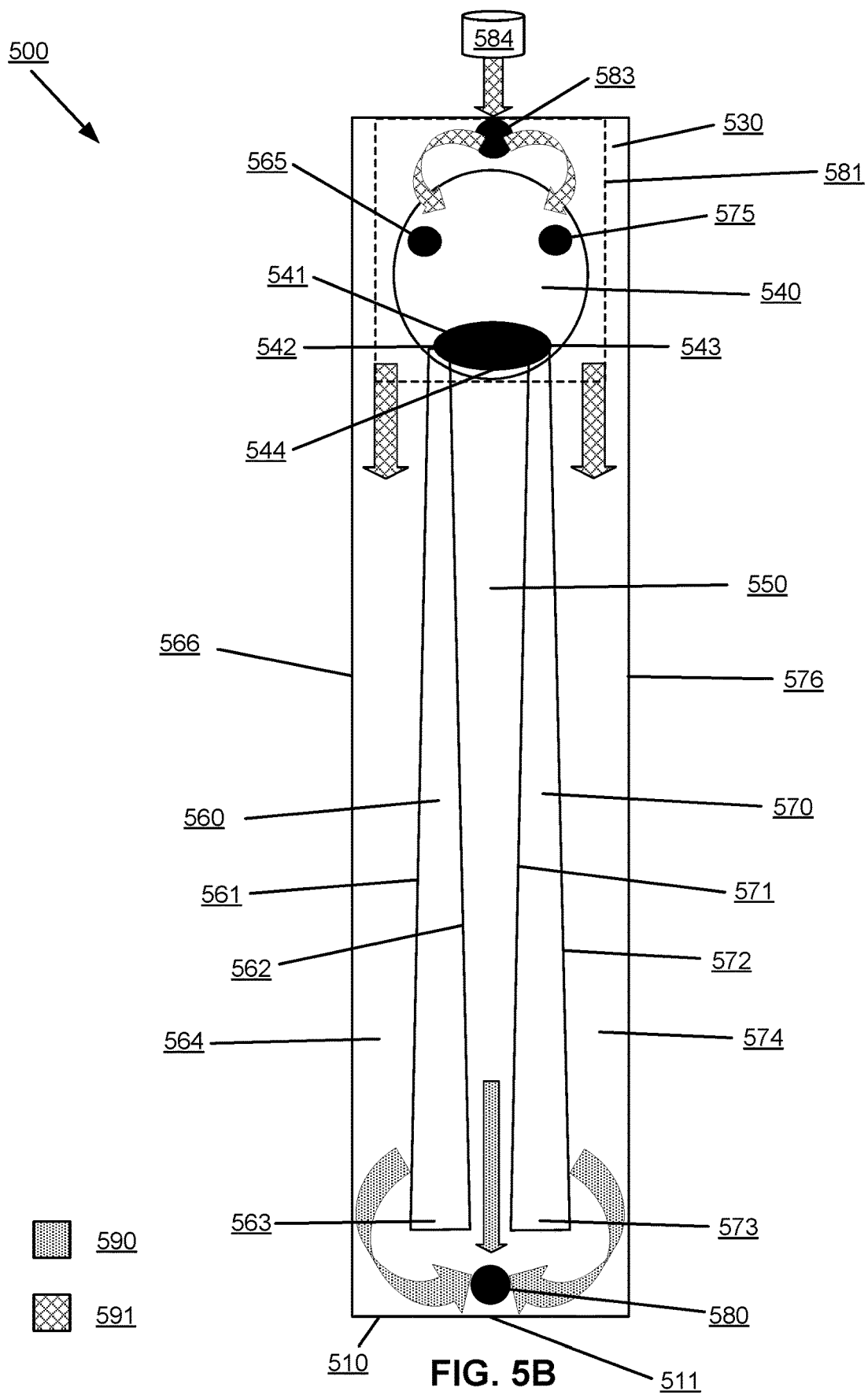
FIG. 5B illustrates a second step of the exemplar method of loading the sample liquid into the assembly and transporting the sample liquid within the assembly, while minimizing spilling of the sample liquid, in accordance with an embodiment.

FIGS. 5A-B illustrate an exemplar method of loading a sample liquid 590 into an assembly 500 and transporting the sample liquid within the assembly, while minimizing spilling of the sample liquid, in accordance with an embodiment. The assembly 500 comprises an entry port 540 and a reservoir. The entry port 240 is located at a proximal region of the assembly 501 and comprises an inlet 541, a first gas vent 565 and a second gas vent 575. The inlet 541 defines an opening of the entry port 540. The inlet 541 of the entry port has a first lateral edge 542, a second lateral edge 543 and a bottom edge 544. The assembly 500 depicted in FIGS. 5A-B comprises two fins (i.e., the first fin 560 and the second fin 570) and two diverging channels (i.e., the first diverging channel 564 and the second diverging channel 574) like the embodiment of the assembly depicted in FIGS. 1B and 2. The fin 560 comprises a first surface 561, a second surface 562 and a distal end 563. The fin 570 comprises a first surface 571, a second surface 572 and a distal end 573. Furthermore, in certain embodiments, the first fin 560 and the second fin 570 are located a substantially equivalent distance from a center point 511 of the distal wall 510. The assembly 500 further comprises a first lateral wall 566 that extends from the proximal region of the assembly 501 to the distal wall 510, such that the first lateral wall 566 contacts the distal wall 510. The assembly 500 further comprises a second lateral wall 576 that extends from the proximal region of the assembly 501 to the distal wall 510, such that the second lateral wall 576 contacts the distal wall 510. The assembly 500 further comprises a base 530. The base extends 530 between the proximal region of the assembly 501 and the distal wall 510 of the reservoir, and bounds, at least in part, the entry port 540 and the reservoir of the assembly. The base 530 can comprise a thin film. In some embodiments, the base 530 further bounds a bottom edge of the inlet 544 of the entry port and/or a bottom surface of the entry port. However, in alternative embodiments, the method may be performed using an assembly comprising a single fin and a single diverging channel like the embodiment of the assembly depicted in FIG. 1A. The assembly depicted in FIGS. 5A-B also comprises two gas vents (i.e., the first gas vent 565 and the second gas vent 575). However, in alternative embodiments, the assembly may comprise any number of gas vents (e.g., one gas vent). The assembly depicted in FIGS. 5A-B also optionally comprises a cap 581, a gas conduit 583, an exit port 580, and a pressurized gas source 584, as do the assemblies depicted in FIGS. 2A and 2B. However, in alternative embodiments, the method may be performed using an assembly that does not comprise these optional features, such as the assemblies depicted in FIGS. 1A-B and 3.

As shown in the legend at the bottom left-hand corner of FIGS. 5A-B, sample liquid is denoted within the figures by a dot pattern. Contrastingly, pressurized gas 591 is denoted within the figures by a cross-hashed pattern.

FIG. 5A illustrates a first step of the exemplar method of loading the sample liquid into the assembly and transporting the sample liquid within the assembly, while minimizing spilling of the sample liquid, in accordance with an embodiment. In embodiments in which the assembly comprises a cap, a gas conduit, and an exit port, such as the embodiment depicted in FIG. 5A, in the first step of the method, the entry port 540 is not sealed with the cap. Furthermore, as indicated by the 'X's in FIG. 5A, both the gas conduit and the exit port are closed such that fluid is prevented from entering or exiting the assembly via the gas conduit and the exit port.

With the cap separated from the entry port, and both the gas conduit and the exit port closed, the sample liquid is introduced into the entry port of the assembly. In some embodiments, the sample liquid can be introduced in to the entry port of the assembly via a pipette.

In some embodiments, a volume of the reservoir of the assembly is about twice a volume of the sample liquid that is introduced into the entry port. As used herein, when used to modify a numerical value (e.g., twice the volume of the sample liquid), the term "about" means that the numerical value differs by no more than +/−50%.

Upon introduction of the sample liquid into the entry port of the assembly, the sample liquid is drawn through the inlet 541 of the entry port, and into the converging channel 550. Once in the converging channel, the sample liquid is then drawn toward the distal region 502 of the assembly via the converging channel, such that the sample liquid contacts the distal wall 510. In other words, the sample liquid is drawn toward the distal portion of the reservoir of the reservoir.

This transport of the sample liquid from the entry port, through the inlet into the converging channel, and finally into the distal portion of the reservoir, is effected through both gravitational forces and capillary action. Specifically, gravity disperses the sample liquid throughout the continuous fluidic pathway such that, independent of any other force, e.g. capillary action, the sample liquid would be distributed throughout the continuous fluidic pathway in a uniformly level (e.g., flat) layer. Capillary action acts within the converging channel to draw the sample liquid through the converging channel in the direction in which the converging channel narrows. Therefore, a combination of gravity and capillary action draws the sample liquid act on the sample liquid into the distal portion of the reservoir.

As briefly discussed above, by quickly drawing the sample liquid into the distal region of the assembly via the converging channel, overflow of the sample liquid from the entry port is avoided. Specifically, upon introduction of the sample liquid into the entry port of the assembly, the sample liquid is drawn through the inlet of the entry port and into the converging channel at a velocity such that the entry port does not overflow with the sample liquid. As discussed above, this transport of the sample liquid is accomplished as a result of the narrowing of the converging channel in the direction of the distal wall of the reservoir.

As the distal portion of the continuous fluidic pathway fills with the sample liquid from the converging channel, the force of gravity continues to disperse the sample liquid into the first diverging channel towards the first gas vent. In embodiments in which the assembly also comprises a second diverging channel, such as the embodiment depicted in FIG. 5A, the force of gravity also disperses the sample liquid into the second diverging channel towards the second gas vent.

However, this dispersion of the sample liquid into the diverging channel(s) towards the gas vent(s) is retarded by the diverging channel(s). Specifically, as discussed above, the diverging channel(s) widen as a distance from the distal wall increases. In other words, as the distance from the distal wall increases, the widths of the diverging channel(s) increase. As a result of these increasing widths of the diverging channel(s), advance of the sample liquid in the diverging channel(s) towards the gas vent(s) is retarded. Due to this retardation of flow of the sample liquid from the distal portion of the reservoir into the diverging channel(s)—in addition to the forces of gravity and capillary action in the converging channel urging the sample liquid into the distal portion of the reservoir—the sample liquid concentrates at the distal portion of the reservoir.

As discussed above, during the first step of the method depicted in FIGS. 5A-B, the cap is removed from the entry port, and therefore the gas vent(s) are unsealed such that pressurized gas can exit the diverging channel(s) of the assembly via the gas vent(s). Specifically, as the sample liquid enters the entry port and then the continuous fluidic pathway of the assembly, the sample liquid displaces the pressurized gas within the continuous fluidic pathway, such that the pressurized gas is forced out of the continuous fluidic pathway via the unsealed gas vent(s) of the entry port.

FIG. 5B illustrates a second step of the exemplar method of loading the sample liquid into the assembly and transporting the sample liquid within the assembly, while minimizing spilling of the sample liquid, in accordance with an embodiment.

In embodiments in which the assembly comprises a cap, such as the embodiment depicted in FIG. 5B, the cap is placed over the entry port such that the entry port is sealed. As a result, fluid (i.e., gas and liquid) is prevented from exiting the assembly via the entry port, and from entering the entry port from outside of the assembly. However, capping the entry port with the cap does not prevent fluid from traveling into and out of the entry port from within the assembly.

After the entry port has been sealed with the cap, the assembly is rotated such that a length of the converging channel of the assembly is parallel to gravity, and such that the sample liquid contained within the assembly travels towards the distal region of the assembly as a result of this rotation.

In embodiments in which the assembly comprises a gas conduit and an exit port, following rotation of the assembly as described above, both the exit port and the gas conduit are opened such that fluid is able to enter and exit the assembly via the gas conduit and the exit port. In embodiments in which the assembly comprises a pressurized gas source connected to the gas conduit, the pressurized gas source supplies pressurized gas to the assembly via the opened gas conduit. In alternative embodiments however, the assembly does not comprise a pressurized gas source attached to the gas conduit. In such embodiments, a pressurized gas source can be attached to the gas conduit, and then a pressurized gas may be supplied to the assembly by the pressurized gas source, via the gas conduit.

As discussed above, in some embodiments, the gas conduit is in fluidic communication with the entry port of the assembly. In such embodiments, the pressurized gas source supplies the pressurized gas into the entry port of the assembly via the opened gas conduit. Upon entry of the pressurized gas into the entry port, the pressurized gas travels into the converging channel via the inlet of the entry port and into the diverging channel(s) via the gas vent(s). Specifically, in embodiments in which the assembly comprises one or more diverging channels in fluidic communication with a shared proximal portion of the reservoir, and thus at least one gas vent in fluidic communication with the shared proximal portion of the reservoir, upon entry of the gas into the entry port, the gas travels into the one or more diverging channels via the at least one gas vent in fluidic communication with the shared proximal portion of the reservoir, and into the converging channel via the inlet. In alternative embodiments, in which the assembly comprises multiple diverging channels, with one or more of the multiple diverging channels in fluidic communication with separate proximal portions of the reservoir, and thus at least one gas vent in fluidic communication with each separate proximal portion of the reservoir, upon entry of the gas into the entry port, the gas travels into the one or more diverging channels in fluidic communication with each separate proximal portion of the reservoir via the at least one gas vent in fluidic communication with each separate proximal portion of the reservoir, and into the converging channel via the inlet.

In alternative embodiments, the gas conduit is in fluidic communication with the converging channel of the assembly at a location proximal to the inlet of the entry port. In a preferred embodiment of this placement of the gas conduit, the gas conduit enters the converging channel from a top wall of the assembly. In such embodiments, the pressurized gas source supplies the pressurized gas into the converging channel of the assembly via the opened gas conduit. Upon entry of the pressurized gas into the converging channel, the pressurized gas directly enters the converging channel and travels into the diverging channel(s) via the inlet of the entry port and the gas vent(s) of the entry port. Specifically, upon entry of the pressurized gas into the converging channel via the gas conduit, the gas directly enters the converging channel, and travels into one or more diverging channels of the assembly via the inlet, the entry port, and the gas vent(s) that are in fluidic communication with one or more proximal portions of the reservoir.

In another alternative embodiment, the gas conduit is in fluidic communication with a proximal portion of the reservoir of the assembly. In such embodiments, the pressurized gas source supplies the pressurized gas into the proximal portion of the reservoir via the opened gas conduit. Upon entry of the pressurized gas into the proximal portion of the reservoir, the pressurized gas travels into the into the diverging channel(s) via the fluidic connections between the diverging channel(s) and the proximal portion of the reservoir, and into the converging channel via the gas vent(s) and the inlet of the entry port. Specifically, in embodiments in which the assembly comprises one or more diverging channels that are in fluidic communication with a shared proximal portion of the reservoir, and thus at least one gas vent in fluidic communication with the shared proximal portion of the reservoir, upon entry of the gas into the shared proximal portion of the reservoir, the gas travels into the one or more diverging channels via the fluidic connection between the shared proximal portion of the reservoir and the one or more diverging channels, and into the converging channel via the at least one gas vent in fluidic communication with the shared proximal portion of the reservoir, the entry port, and the inlet of the entry port. In alternative embodiments in which the assembly comprises multiple diverging channels, with one or more of the multiple diverging channels in fluidic communication with separate proximal portions of the reservoir, and thus at least one gas vent in fluidic communication with each separate proximal portion of the reservoir, upon entry of the gas into the entry port, when the gas enters one of the separate proximal portions of the reservoir via the gas conduit, the gas travels into the one or more diverging channels in fluidic communication with the one separate proximal portion of the reservoir via the fluidic communication between the one separate proximal portion of the reservoir and the one or more diverging channels. Then, to travel into the one or more diverging channels in fluidic communication with the other separate proximal portion(s) of the reservoir, the gas travels into the entry port via the at least one gas vent in fluidic communication with the one separate proximal portion of the reservoir, into the other separate proximal portion(s) of the reservoir via the at least one gas vent in fluidic communication with each of the other separate proximal portion(s) of the reservoir, and into the one or more diverging channels in fluidic communication with the other separate proximal portion(s) of the reservoir via the fluidic connection(s) between the one or more diverging channels and the other separate proximal portion(s) of the reservoir. Finally, to travel into the converging channel, the gas travels through the inlet of the entry port into the converging channel.

Regardless of the path by which the pressurized gas enters the converging channel and the diverging channel(s), entry of the pressurized gas into the converging channel and the diverging channel(s) forces the sample liquid located in the converging channel and in the diverging channel(s) towards the open exit port. Upon reaching the open exit port, the sample liquid is transported out of the reservoir via the open exit port.

Figure 6A:
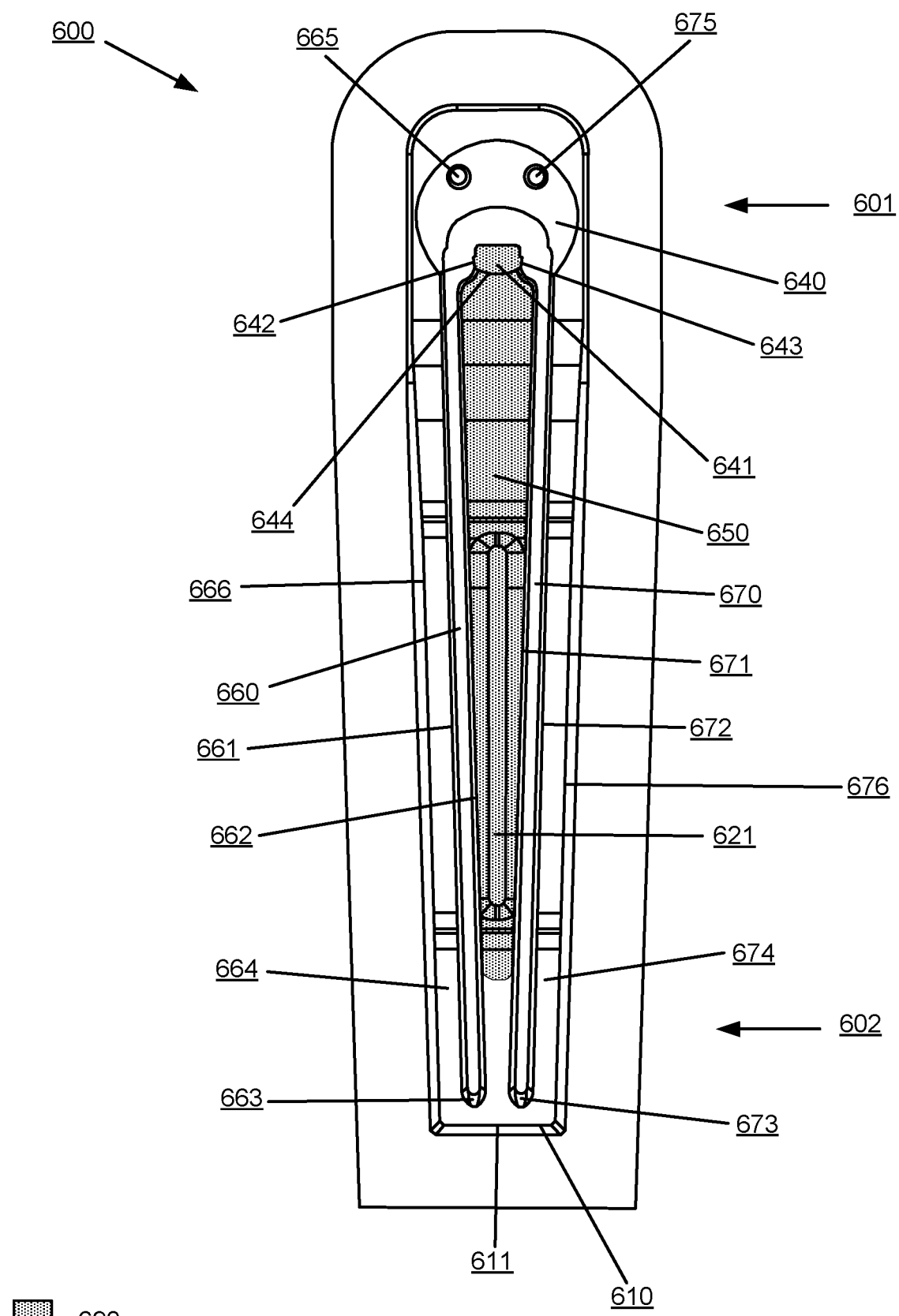
FIG. 6A depicts an assembly at a time A during loading of a sample liquid into the assembly and transport of the sample liquid within the assembly, while minimizing spilling of the sample liquid, in accordance with an embodiment.
Figure 6B:
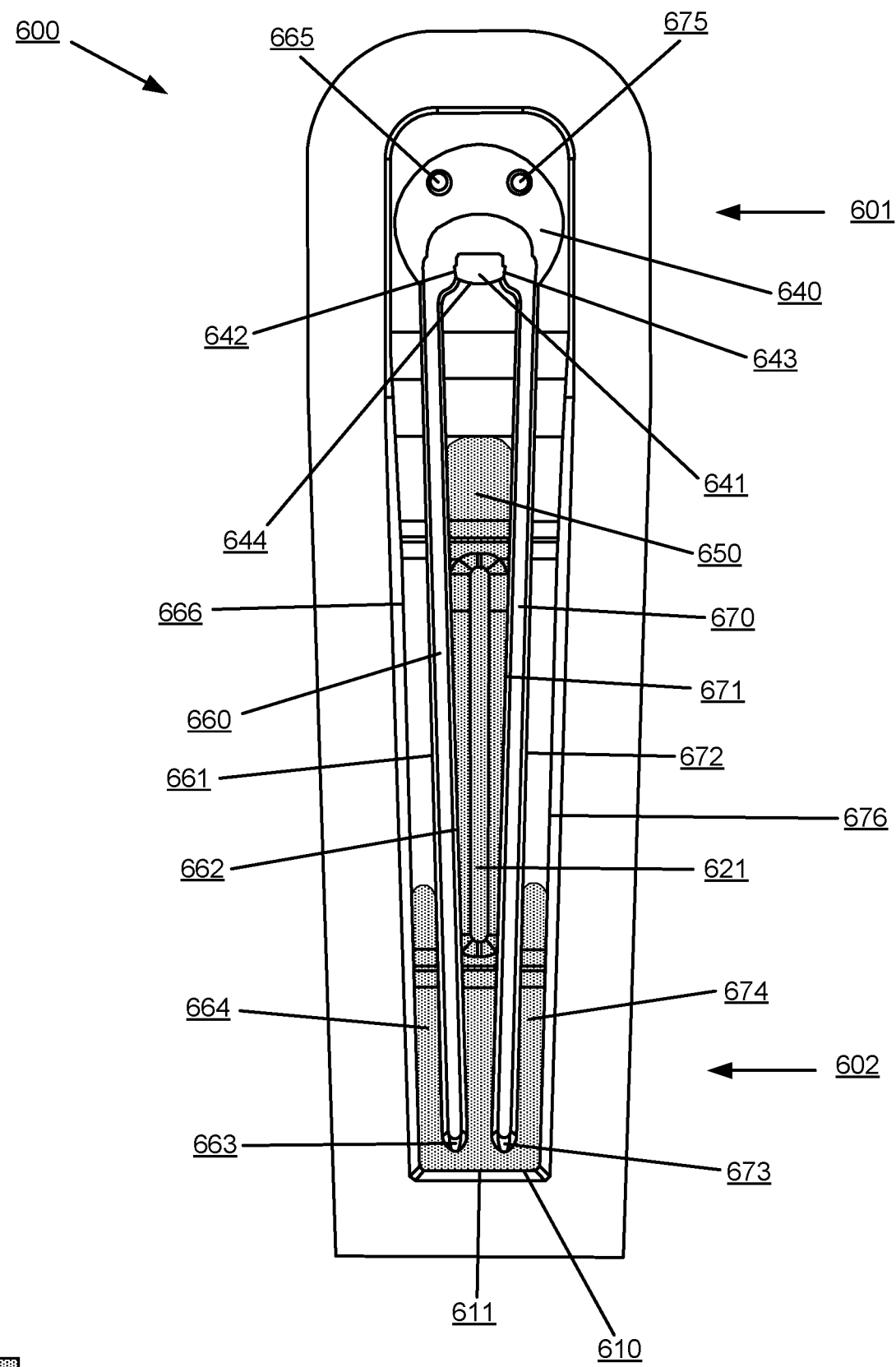
FIG. 6B depicts an assembly at a time B during loading of a sample liquid into the assembly and transport of the sample liquid within the assembly, while minimizing spilling of the sample liquid, in accordance with an embodiment.
Figure 6C:
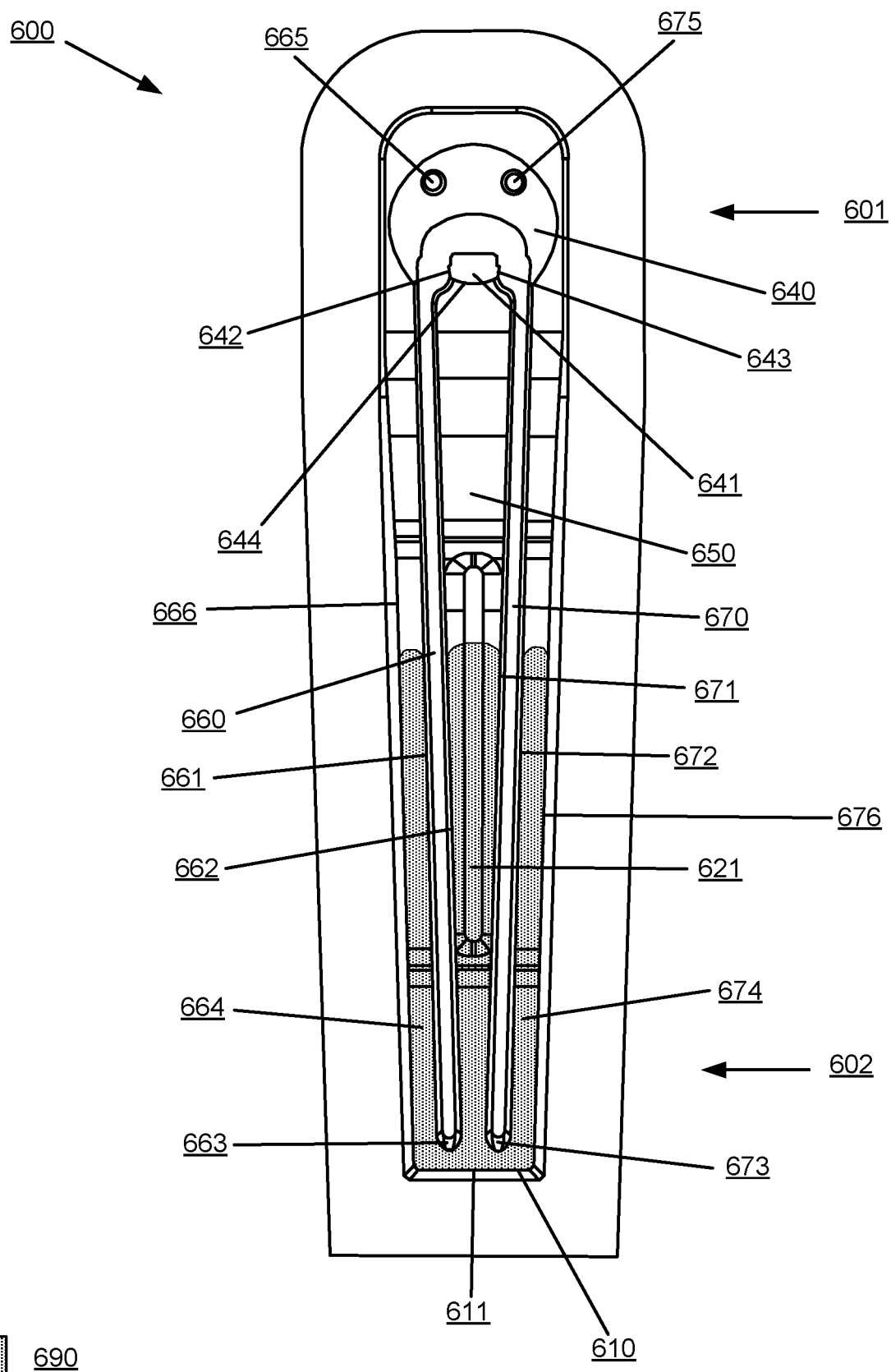
FIG. 6C depicts an assembly at a time C during loading of a sample liquid into the assembly and transport of the sample liquid within the assembly, while minimizing spilling of the sample liquid, in accordance with an embodiment.

FIGS. 6A-C depict an assembly 600 at sequential time points during loading of a sample liquid 690 into the assembly and transport of the sample liquid within the assembly, while minimizing spilling of the sample liquid, in accordance with an embodiment. The assembly of FIGS. 6A-C is similar to the assemblies of FIGS. 2A and 2B. The assembly 600 comprises an entry port 640 and a reservoir. The entry port 640 is located at a proximal region of the assembly 601 and comprises an inlet 641, a first gas vent 665 and a second gas vent 675. The inlet 641 defines an opening of the entry port 640. The inlet 641 of the entry port has a first lateral edge 642, a second lateral edge 643 and a bottom edge 644. Like the assemblies of FIGS. 2A and 2B, the assembly of FIGS. 6A-C comprises a single converging channel, two fins (i.e., the first fin 660 and the second fin 670), two diverging channels (i.e., the first diverging channel 664 and the second diverging channel 674), and two gas vents (i.e., the first gas vent 665 and the second gas vent 675). The fin 660 comprises a first surface 661, a second surface 662 and a distal end 663. The fin 670 comprises a first surface 671, a second surface 672 and a distal end 673. Furthermore, in certain embodiments, the first fin 660 and the second fin 670 are located a substantially equivalent distance from a center point 611 of the distal wall 610. The assembly 600 further comprises a first lateral wall 666 that extends from the proximal region of the assembly 601 to the distal wall 610, such that the first lateral wall 666 contacts the distal wall 610. The assembly 600 further comprises a second lateral wall 676 that extends from the proximal region of the assembly 601 to the distal wall 610, such that the second lateral wall 676 contacts the distal wall 610. However, in alternative embodiments, the assembly may comprise any number of converging channels, fins, diverging channels, and gas vents. Unlike the assemblies of FIGS. 2A and 2B, the assembly depicted in FIGS. 6A-C does not comprise the optional features of a cap, a gas conduit, an exit port, and a pressurized gas source. However, in alternative embodiments, the method may be performed using an assembly that does comprise these optional features. As shown in the legend at the bottom left-hand corner of FIGS. 6A-C, sample liquid is denoted within the figures by a dot pattern.

FIG. 6A depicts the assembly at a time A. At the time A, the sample liquid has been introduced into the entry port 640 of the assembly and is being drawn through the inlet 641 of the entry port and into the converging channel 650, as described above with regard to FIG. 5A. The inlet 641 defines an opening of the entry port 640, and comprises a first lateral edge 642, a second lateral edge 643 and a bottom edge 644. As seen in FIG. 6A, at the time A, the sample liquid travels through the converging channel in the direction of the distal wall 610, but the leading front of sample liquid has not yet exited the converging channel and entered the distal portion of the reservoir.

FIG. 6B depicts the apparatus at a time B that is subsequent to the time A. At the time B, the leading front of the sample liquid has travelled into and beyond the distal region 602 of the assembly, such that the sample liquid is in contact with the distal wall. In other words, at the time B, the sample liquid has been drawn toward the distal portion of the reservoir. Fluid continues to be drawn into the converging channel toward the distal end. Furthermore, as seen in FIG. 6B, the sample liquid has begun to flow into the first diverging channel towards the first gas vent and into the second diverging channel towards the second gas vent.

FIG. 6C depicts the apparatus at a time C that is subsequent to the time B. At the time C, the sample liquid continues to flow into the first diverging channel towards the first gas vent and into the second diverging channel towards the second gas vent. However, the dispersion of the sample liquid into the first and second diverging channels is retarded by the diverging channels. This retardation of flow of the sample liquid into the diverging channels, along with the forces of gravity and capillary action in the converging channel urging the sample liquid into the distal portion of the reservoir, causes the sample liquid to concentrate in the distal portion of the reservoir. Flow of the sample liquid stops when the forces pushing the sample liquid into the distal portion of the reservoir from the converging channel are equal to the forces pushing the sample liquid into the distal portion of the reservoir from the diverging channels. As seen in FIG. 6C, when flow of the sample liquid stops, the sample liquid is concentrated at the distal region of the assembly. While FIG. 6C illustrates the fluid fronts in the diverging and converging channels as being equidistant from the distal wall at the conclusion of loading, the leading and trailing fluid fronts may be the same or different distances from the distal wall.

As briefly mentioned above, in embodiments in which the assembly comprises a top wall, the top wall may or may not contact one or more of the fins of the assembly. For example, in some embodiments, there may be a gap of space between one of more of the fins and the top wall. However, the positioning of the fins with respect to the top wall does not affect functioning of the assembly. More specifically, in embodiments of the assembly in which the top wall does not contact one or more fins of the assembly, loading of the assembly with the sample liquid and evacuation of the sample liquid from the reservoir of the assembly occurs normally as described above.

As discussed above, in some embodiments, a transparent viewing window 621 is located above the reservoir of the assembly. In such embodiments, throughout the evacuation of the sample liquid from the assembly, a height of the sample liquid within the reservoir can be monitored via the transparent viewing window. By monitoring the height of the sample liquid in the reservoir, success of the evacuation of the sample liquid from the assembly can be determined by a user of the assembly.

Figure 7:
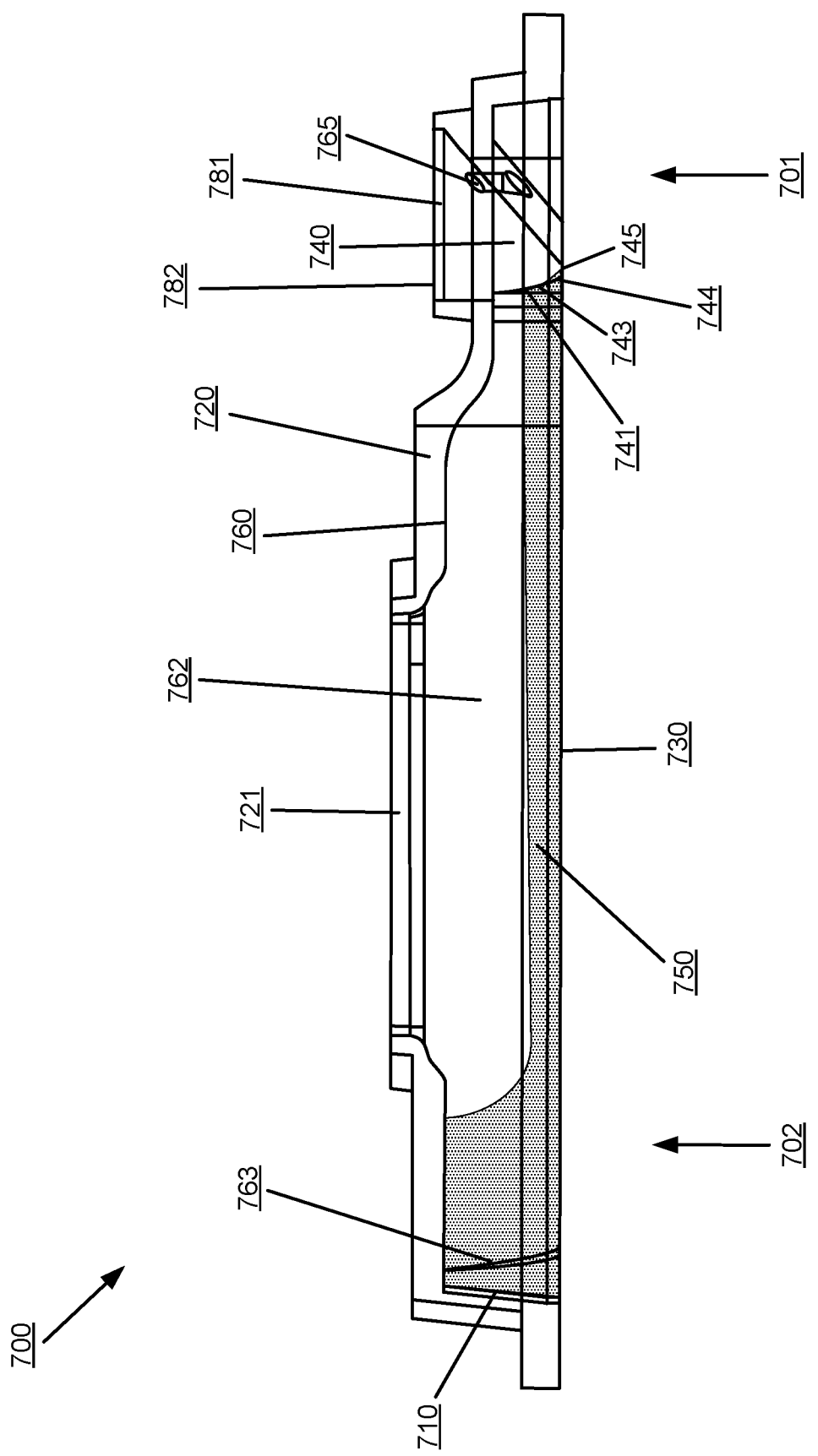
FIG. 7 depicts a cut-away profile view of the assembly of FIGS. 6A-C, at the end of loading of the assembly with the sample liquid, prior to the time B depicted in FIG. 6B, in accordance with an embodiment.

FIG. 7 depicts a cut-away profile view of the assembly of FIGS. 6A-C, at the end of loading of the assembly with the sample liquid, prior to the time B depicted in FIG. 6B, in accordance with an embodiment. More specifically, FIG. 7 depicts the interior of the assembly of FIGS. 6A-C, such that the converging channel 750 is visible. As shown in the legend at the bottom left-hand corner of FIG. 7, sample liquid 790 is denoted within the figures by a dot pattern. The assembly 700 comprises an entry port 740 and a reservoir. The entry port 740 is located at a proximal region of the assembly 701 and comprises an inlet 741 and a first gas vent 765. The inlet 741 defines an opening of the entry port 740. The inlet 741 of the entry port has a second lateral edge 743 and a bottom edge 744. The cap 781 and the cap top 782 are shown adjacent entry port 740. The assembly 700 further comprises a base 730. The base extends 730 between the proximal region of the assembly 701 and the distal wall 710 of the reservoir at the distal region of the assembly 702, and bounds, at least in part, the entry port 740 and the reservoir of the assembly. In some embodiments, the base 730 further bounds a bottom edge of the inlet 744 of the entry port and/or a bottom surface of the entry port 745. The first fin 760, distal end 763 of first fin 760 and the second surface 762 of the first fin are shown in this view. The top wall 720 and the transparent window 721 are shown adjacent to the first fin 760.

As seen in FIG. 7, loading of the sample liquid into the entry port 740 of the assembly has just been completed, and the recently loaded sample liquid is being drawn from the inlet 741 of the entry port, through the converging channel, and into the distal portion of the reservoir such that the sample liquid is in contact with the distal wall 710. Furthermore, while not visible in the cut-away of FIG. 7, the sample liquid has begun to flow into the diverging channels towards the gas vents (e.g., the first gas vent 765).

FIGURE NUMBERING KEY

| Item | Numbering suffix |
|---|---|
| assembly | 00 |
| proximal region of the assembly | 01 |
| distal region of the assembly | 02 |
| distal wall | 10 |
| center point of the distal wall | 11 |
| top wall | 20 |
| transparent viewing window | 21 |
| base | 30 |
| entry port | 40 |
| inlet | 41 |
| first lateral edge of the inlet | 42 |
| second lateral edge of the inlet | 43 |
| bottom edge of the inlet | 44 |
| bottom surface of the entry port | 45 |
| converging channel | 50 |
| first fin | 60 |
| first surface of the first fin | 61 |
| second surface of the first fin | 62 |
| distal end of the first fin | 63 |
| first diverging channel | 64 |
| first gas vent | 65 |
| first lateral wall | 66 |
| second fin | 70 |
| first surface of the second fin | 71 |
| second surface of the second fin | 72 |
| distal end of the second fin | 73 |
| second diverging channel | 74 |
| second gas vent | 75 |
| second lateral wall | 76 |
| exit port | 80 |
| cap | 81 |
| top of the cap | 82 |
| gas conduit | 83 |
| pressurized gas source | 84 |

-continued

FIGURE NUMBERING KEY

| Item | Numbering suffix |
|---|---|
| sample liquid | 90 |
| gas | 91 |

What is claimed is:

1. An assembly, comprising:
an entry port located at a proximal region of the assembly, the entry port comprising:
an inlet defining an opening having a first lateral edge and a second lateral edge; and
a first gas vent;
a reservoir comprising:
a distal wall located at a distal region of the assembly;
a first fin extending from the first lateral edge of the inlet towards the distal wall, the first fin comprising a first surface and a second surface; and
a continuous fluidic pathway comprising:
a converging channel defined in part by the second surface of the first fin, the converging channel in fluidic communication with the inlet; and
a first diverging channel defined in part by the first surface of the first fin, the first diverging channel in fluidic communication with the first gas vent of the entry port,
wherein, at a distal end of the first fin, a width of the converging channel is substantially equivalent to, or less than, a width of the first diverging channel, and
wherein a distance between the distal end of the first fin and the distal wall is substantially equivalent to, or less than, the width of the converging channel at the distal end of the first fin.

2. The assembly of claim 1, wherein the reservoir holds a volume of up to 10 milliliters.

3. The assembly of claim 1, wherein the first diverging channel is further defined by a first lateral wall of the reservoir, the first lateral wall extending between the proximal region of the assembly and the distal wall.

4. The assembly of claim 1, wherein the reservoir is taller at the distal end of the first fin than at the inlet of the entry port.

5. The assembly of claim 1, wherein, at the inlet of the entry port, the converging channel is taller than the inlet.

6. The assembly of claim 1, wherein at least a portion of the converging channel is at least twice as tall as the inlet of the entry port.

7. The assembly of claim 1, wherein the first fin increases in thickness as a distance from the entry port increases.

8. The assembly of claim 1, wherein the converging channel is further defined by a second lateral wall of the reservoir, the second lateral wall extending between the proximal region of the assembly and the distal wall.

9. The assembly of claim 1, wherein the reservoir further comprises a second fin, the second fin extending from the second lateral edge of the inlet towards the distal wall, the second fin comprising a first surface, and a second surface, the first surface of the second fin further defining the converging channel, the second surface of the second fin defining, in part, a second diverging channel,
wherein, at a distal end of the second fin, the width of the converging channel is substantially equivalent to, or less than, a width of the second diverging channel, and wherein a distance between the distal end of the second fin and the distal wall is substantially equivalent to, or less than, the width of the converging channel at the distal end of the second fin.

10. The assembly of claim 9, wherein the first fin and the second fin are located a substantially equivalent distance from a center point of the distal wall.

11. The assembly of claim 9, where a length of the first fin is substantially equivalent to a length of the second fin.

12. The assembly of claim 9, wherein the entry port further comprises a second gas vent, and wherein the second diverging channel is in fluidic communication with the second gas vent.

13. The assembly of claim 9, wherein the second diverging channel is further defined by a second lateral wall of the reservoir, the second lateral wall extending between the proximal region of the assembly and the distal wall.

14. The assembly of claim 9, wherein a contact angle between water and a surface of the assembly is between 90 and 120 degrees.

15. The assembly of claim 9, wherein the second fin increases in thickness as a distance from the entry port increases.

16. The assembly of claim 9, further comprising a top wall, the top wall extending between the proximal region of the assembly and the distal wall, the top wall bounding, at least in part, the reservoir.

17. The assembly of claim 16, wherein the top wall contacts the first fin.

18. The assembly of claim 16, wherein the top wall further contacts the second fin.

19. The assembly of claim 16, wherein at least a portion of the top wall comprises a transparent viewing window.

20. The assembly of claim 1, further comprising a base, the base extending between the proximal region of the assembly and the distal wall of the reservoir, the base bounding, at least in part, the entry port and the reservoir.

21. The assembly of claim 20, wherein the base further bounds, at least in part, a bottom edge of the inlet of the entry port.

22. The assembly of claim 20, wherein the base further bounds, at least in part, a bottom surface of the entry port.

23. The assembly of claim 20, wherein the base comprises a thin film.

24. The assembly of claim 1, wherein the width of the converging channel at the inlet is less than a height of the inlet of the entry port.

25. The assembly of claim 1, wherein the width of the converging channel decreases linearly as a function of increasing distance from the entry port.

26. The assembly of claim 1, wherein the assembly comprises a hydrophobic material.

27. The assembly of claim 1, wherein the reservoir further comprises an exit port located at the distal region of the assembly.

28. The assembly of claim 27, further comprising: a cap configured to seal the entry port.

29. The assembly of claim 28, further comprising a gas conduit located at the proximal region of the assembly.

30. The assembly of claim 29, wherein the gas conduit is in fluidic communication with the entry port.

31. The assembly of claim 29, wherein the gas conduit is in fluidic communication with the reservoir at the proximal region of the assembly.

32. The assembly of claim 29, further comprising a pressurized gas source in fluidic communication with the gas conduit, the pressurized gas source configured to supply a gas to the gas conduit.

33. The assembly of claim 29, wherein the gas conduit and the exit port are closed and the cap is removed such that entry port is not sealed.

34. The assembly of claim 29, wherein the cap is in place such that the entry port is sealed and the exit port and the gas conduit are open.

35. A fluidic device comprising, at least in part, an assembly according to claim 28.

36. The fluidic device of claim 35, wherein a top of the cap is flush with a surface of the fluidic device when the cap is in place such that the entry port is sealed.

37. The fluidic device of claim 35, wherein a top of the cap is recessed from a surface of the fluidic device when the cap is in place such that the entry port is sealed.

38. A method of loading a sample liquid into an assembly according to claim 1, the method comprising:
receiving the assembly according to claim 1; and
introducing a sample liquid into the entry port, whereupon the sample liquid is drawn through the inlet of the entry port into the converging channel,
whereupon entering the converging channel, the sample liquid is drawn toward the distal region of the assembly and contacts the distal wall,
whereupon entering the distal region of the assembly, the sample liquid flows into the first diverging channel,
wherein the first diverging channel retards flow of the sample liquid in the first diverging channel toward the first gas vent, thereby causing the sample liquid to concentrate at the distal region of the assembly.

39. The method of claim 38, wherein the assembly further comprises:
a cap configured to seal the entry port;
a gas conduit located at a proximal region of the assembly, the gas conduit in fluidic communication with the entry port;
a pressurized gas source in fluidic communication with the gas conduit, the pressurized gas source configured to pump a gas into the gas conduit; and
an exit port located at the distal region of the assembly; and
wherein the method further comprises the steps of:
placing the cap over the entry port such that the entry port is sealed;
rotating the assembly such that a length of the converging channel is parallel to gravity;
opening the exit port and the gas conduit; and
supplying, with the pressurized gas source, via the gas conduit, a gas into the entry port of the assembly, whereupon supplying the gas, the gas travels into the first diverging channel via the first gas vent and into the converging channel via the inlet, thereby forcing the sample liquid located in the converging channel and in the first diverging channel toward the opened exit port, thereby forcing the sample liquid out of the assembly via the opened exit port.

40. The method of claim 38, wherein the assembly further comprises:
a cap configured to seal the entry port;
a gas conduit located at a proximal region of the assembly, the gas conduit in fluidic communication with the reservoir at the proximal region of the assembly;

a pressurized gas source in fluidic communication with the gas conduit, the pressurized gas source configured to pump a gas into the gas conduit; and an exit port located at the distal region of the assembly; and wherein the method further comprises the steps of:
placing the cap over the entry port such that the entry port is sealed;
rotating the assembly such that a length of the converging channel is parallel to gravity;
opening the exit port and the gas conduit; and
supplying, with the pressurized gas source, via the gas conduit, a gas into the reservoir at the proximal region of the assembly, whereupon supplying the gas, the gas travels into the first diverging channel via the reservoir at the proximal region of the assembly and into the converging channel via the first gas vent and the inlet of the entry port, thereby forcing the sample liquid located in the converging channel and in the first diverging channel toward the opened exit port, thereby forcing the sample liquid out of the assembly via the opened exit port.

41. A method of loading a sample liquid into an assembly according to claim 9, the method comprising:
receiving the assembly according to claim 9; and
introducing a sample liquid into the entry port, whereupon the sample liquid is drawn through the inlet of the entry port into the converging channel,
whereupon entering the converging channel, the sample liquid is drawn toward the distal region of the assembly and contacts the distal wall,
whereupon entering the distal region of the assembly, the sample liquid flows into the first diverging channel and into the second diverging channel,
wherein the first diverging channel and the second diverging channel retard flow of the sample liquid in the first diverging channel and in the second diverging channel toward the proximal region of the assembly, thereby causing the sample liquid to concentrate at the distal region of the assembly.

42. The method of claim 41, wherein the assembly further comprises:
a cap configured to seal the entry port;
a gas conduit located at a proximal region of the assembly, the gas conduit in fluidic communication with the entry port;
a pressurized gas source in fluidic communication with the gas conduit, the pressurized gas source configured to pump a gas into the gas conduit; and
an exit port located at the distal region of the assembly; and wherein the method further comprises the steps of:
placing the cap over the entry port such that the entry port is sealed;
rotating the assembly such that a length of the converging channel is parallel to gravity;
opening the exit port and the gas conduit; and
supplying, with the pressurized gas source, via the gas conduit, a gas into the entry port of the assembly, whereupon supplying the gas, the gas travels into the first diverging channel via the first gas vent, into the second diverging channel via the reservoir at the proximal region of the assembly, and into the converging channel via the inlet, thereby forcing the sample liquid located in the converging channel, in the first diverging channel, and in the second diverging channel toward the opened exit port, thereby forcing the sample liquid out of the assembly via the opened exit port.

43. The method of claim 42, wherein the assembly further comprises:
a second gas vent in the entry port, the second gas vent in fluidic communication with the second diverging channel; and
whereupon supplying, with the pressurized gas source, via the gas conduit, the gas into the entry port of the assembly, the gas travels into the second diverging channel via the second gas vent.

44. The method of claim 41, wherein the assembly further comprises:
a cap configured to seal the entry port;
a gas conduit located at a proximal region of the assembly, the gas conduit in fluidic communication with the reservoir at the proximal region of the assembly;
a pressurized gas source in fluidic communication with the gas conduit, the pressurized gas source configured to pump gas into the gas conduit; and
an exit port located at the distal region of the assembly; and wherein the method further comprises the steps of:
placing the cap over the entry port such that the entry port is sealed;
rotating the assembly such that a length of the converging channel is parallel to gravity;
opening the exit port and the gas conduit; and
supplying, with the pressurized gas source, via the gas conduit, gas into the reservoir at the proximal region of the assembly, whereupon supplying the gas, the gas travels into the first diverging channel and the second diverging channel via the reservoir at the proximal region of the assembly, and into the converging channel via the first gas vent and the inlet of the entry port, thereby forcing the sample liquid located in the converging channel, in the first diverging channel, and in the second diverging channel toward the opened exit port, thereby forcing the sample liquid out of the assembly via the opened exit port.

45. The method of claim 44, wherein the assembly further comprises:
a second gas vent in the entry port, the second gas vent in fluidic communication with the second diverging channel; and
whereupon supplying, with the pressurized gas source, via the gas conduit, the gas into the entry port of the assembly, the gas travels into the converging channel via the first gas vent, the second gas vent, and the inlet of the entry port.

46. The method of claim 39, further comprising, prior to introducing the sample liquid:
removing the cap from the entry port such that the entry port is not sealed; and
closing the gas conduit and the exit port.

47. The method of claim 38, whereupon introducing the sample liquid into the entry port, the sample liquid is drawn through the inlet of the entry port into the converging channel at a rate such that the entry port does not overflow with the sample liquid.

48. The method of claim 38, wherein the assembly further comprises:
a transparent viewing window located above the reservoir; and wherein the method further comprises the step of:
monitoring a height of the sample liquid within the reservoir via the transparent viewing window.

49. The method of claim 38, wherein the sample liquid is introduced into the entry port via a pipette.

50. The method of claim 38, wherein a volume of the reservoir is about twice a volume of the introduced sample liquid.

* * * * *